US012208822B2

(12) United States Patent
Funke et al.

(10) Patent No.: US 12,208,822 B2
(45) Date of Patent: *Jan. 28, 2025

(54) TRAJECTORY DETERMINATION FOR FOUR-WHEEL STEERING

(71) Applicant: Zoox, Inc., Foster City, CA (US)

(72) Inventors: Joseph Funke, Redwood City, CA (US); David Evan Zlotnik, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/075,051

(22) Filed: Dec. 5, 2022

(65) Prior Publication Data

US 2023/0166770 A1   Jun. 1, 2023

Related U.S. Application Data

(63) Continuation of application No. 16/917,431, filed on Jun. 30, 2020, now Pat. No. 11,518,412.

(51) Int. Cl.
  *B60W 50/00*  (2006.01)
  *B60W 50/04*  (2006.01)
  *B60W 60/00*  (2020.01)
  *B62D 7/14*   (2006.01)
(52) U.S. Cl.
  CPC ...... *B60W 60/0025* (2020.02); *B60W 50/045* (2013.01); *B62D 7/142* (2013.01); *B60W 2510/20* (2013.01)

(58) Field of Classification Search
  USPC ............................ 701/23–28, 36, 41–44
  See application file for complete search history.

(56) References Cited

U.S. PATENT DOCUMENTS

| 4,671,523 A | 6/1987 | Naumann |
| 5,402,341 A | 3/1995 | Liubakka et al. |

(Continued)

FOREIGN PATENT DOCUMENTS

| DE | 102017213193 A1 | 1/2019 |
| EP | 2955082 A1 | 5/2015 |

(Continued)

OTHER PUBLICATIONS

Tu, Xuyong, "Robust navigation control and headland turning optimization of agricultural vehicles" ( 2013), Graduate Theses and Dissertations. 13188. (Year: 2013).*

(Continued)

*Primary Examiner* — Jonathan L Sample
(74) *Attorney, Agent, or Firm* — Lee & Hayes, P.C.

(57) ABSTRACT

Four-wheel steering of a vehicle, e.g., in which leading wheels and trailing wheels are steered independently of each other, can provide improved maneuverability and stability. A first vehicle model may be used to determine trajectories for execution by a vehicle equipped with four-wheel steering. A second vehicle model may be used to control the vehicle relative to the determined trajectories. For instance, the second vehicle model can determine leading wheels steering angles for steering leading wheels of the vehicle and trailing wheels steering angles for steering trailing wheels of the vehicle, independently of the leading wheels.

20 Claims, 7 Drawing Sheets

(56) References Cited

U.S. PATENT DOCUMENTS

| | | | |
|---|---|---|---|
| 8,494,716 B1* | 7/2013 | Lee | G05D 1/0246 |
| | | | 701/41 |
| 8,594,888 B2* | 11/2013 | Fujita | B62D 7/159 |
| | | | 180/407 |
| 8,903,607 B2 | 12/2014 | Lee et al. | |
| 10,407,035 B1 | 9/2019 | Gadda et al. | |
| 10,488,172 B1* | 11/2019 | Funke | B62D 6/04 |
| 10,599,151 B1* | 3/2020 | Gunbatar | G05D 1/0212 |
| 10,759,416 B1* | 9/2020 | Funke | B60T 8/17554 |
| 10,821,981 B1* | 11/2020 | Funke | B62D 7/159 |
| 10,836,383 B2 | 11/2020 | Ersal et al. | |
| 2003/0088350 A1 | 5/2003 | Lin et al. | |
| 2009/0276111 A1* | 11/2009 | Wang | G05D 1/0278 |
| | | | 701/41 |
| 2012/0065842 A1 | 3/2012 | Ghoneim et al. | |
| 2012/0109415 A1 | 5/2012 | Nitta et al. | |
| 2013/0179036 A1 | 7/2013 | Lee et al. | |
| 2014/0229072 A1* | 8/2014 | Kang | B62D 7/159 |
| | | | 701/42 |
| 2017/0291638 A1 | 10/2017 | Gupta | |
| 2017/0361872 A1 | 12/2017 | Gupta et al. | |
| 2018/0043931 A1 | 2/2018 | Gupta et al. | |
| 2018/0057048 A1* | 3/2018 | Joyce | B60W 10/20 |
| 2018/0208240 A1 | 7/2018 | Farr et al. | |
| 2018/0273092 A1* | 9/2018 | Engels | B62D 15/0285 |
| 2018/0354513 A1 | 12/2018 | Moshchuk et al. | |
| 2019/0064823 A1 | 2/2019 | Jiang et al. | |
| 2019/0118858 A1 | 4/2019 | Flores De Jesus et al. | |
| 2019/0270478 A1* | 9/2019 | Kim | B62D 15/025 |
| 2019/0351895 A1* | 11/2019 | Ben-Ari | B60K 6/26 |
| 2020/0164918 A1 | 5/2020 | Newton et al. | |
| 2020/0189656 A1* | 6/2020 | Hiroe | B62D 7/1509 |
| 2020/0201324 A1* | 6/2020 | Darayan | B60W 50/0205 |
| 2020/0272160 A1* | 8/2020 | Djuric | G06T 7/20 |
| 2020/0333792 A1* | 10/2020 | Buss | G05D 1/0217 |
| 2020/0406969 A1 | 12/2020 | Ersal et al. | |
| 2021/0000004 A1 | 1/2021 | Robinson | |
| 2021/0000005 A1 | 1/2021 | Robinson | |
| 2021/0023934 A1* | 1/2021 | Gillett | B62J 43/10 |
| 2021/0080961 A1* | 3/2021 | Shenai | B62D 7/144 |
| 2021/0123750 A1* | 4/2021 | Im | G01C 21/3676 |
| 2021/0139038 A1* | 5/2021 | Wang | G05D 1/0088 |
| 2021/0403049 A1 | 12/2021 | Funke et al. | |
| 2021/0403081 A1 | 12/2021 | Funke et al. | |
| 2021/0403082 A1 | 12/2021 | Funke et al. | |

FOREIGN PATENT DOCUMENTS

| | | |
|---|---|---|
| GB | 2448471 | 10/2008 |
| WO | WO0032462 A1 | 6/2000 |
| WO | WO2017079304 A1 | 5/2017 |

OTHER PUBLICATIONS

Office Action for U.S. Appl. No. 16/917,462, mailed Jan. 11, 2022, Funke, "Trajectory Tracking With Four-Wheel Steering", 13 pages.

Office Action for U.S. Appl. No. 16/917,431, mailed on Jan. 21, 2022, Funke, "Trajectory Determination for Four-Wheel Steering", 18 pages.

Office Action for U.S. Appl. No. 16/917,431, malled on Jul. 6, 2021, Funke, "Trajectory Determination for Four-Wheel Steering", 14 pages.

The International Search Report and Written Opinion for PCT Application No. PCT/US21/39590, mailed Sep. 30, 2021, 189 Pages.

Tu Xuyong, "Robust navigation control and headland turning optimization of agricultural vehicles", Iowa State Univ. Capstones, Theses and Dissertations,2013, [online] [retrieved on Aug. 19, 2021]. Retrieved from <https://lib.dr.iastate.edu/etd/13188/>, abstract, p. 2, par. 2, p. 10, par. 1, p. 18, par. 2.3.1,-p. 19 par. 2.3.2, p. 20, par. 2.4, p. 41, pars. 3.4.1, 3.4.2, p. 72, par. 4.3.2.2, p. 80, par. 4.5.2, p. 89, par. 4.6.3.2, p. 91, par. 4.6.4, p. 97, par. 4.7.2, p. 100, par. 4.7.3, figures 2.6, 2.8, 2.12, 2.18, 2.24, 3.4, 3.5, 3.10, 3.12, 4.8,4.9, 4.11, 4.18, table 2.2, 180 pages.

The European Search Report and Written Opinion mailed Jun. 25, 2024 for European Application No. 21832123.0, 9 pages.

* cited by examiner

TRAJECTORY DETERMINATION FOR FOUR-WHEEL STEERING

CROSS REFERENCE TO RELATED APPLICATIONS

This is a continuation application which claims priority to commonly assigned, co-pending U.S. patent application Ser. No. 16/917,431, filed Jun. 30, 2020. Application Ser. No. 16/917,431 is fully incorporated herein by reference.

BACKGROUND

Some autonomous vehicle systems provide for independent steering, e.g., of front and rear wheels. More specifically, unlike many conventional vehicles that include steerable front wheels and fixed rear wheels, some vehicles are intended for driving in either of two "forward" directions, e.g., such that wheels at a first end can be leading or trailing wheels. To enable this bidirectionality, the wheels at each end are independently steerable. Many conventional autonomous systems of this type maneuver the vehicle by steering the leading wheels and maintaining the trailing wheels fixed. Accordingly, despite the four-wheel steering functionality, the vehicle performs as a conventional, front-wheel steering vehicle. Approximating a two-wheel steering vehicle may be the preferred approach, because modeling two-wheel vehicles may be simpler and relatively well-known. However, controlling the autonomous vehicle with active steering at all four wheels may provide benefits over a two-wheel steering design. For instance, four-wheel steering may provide greater maneuverability and/or stability than conventional two-wheel steering systems.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
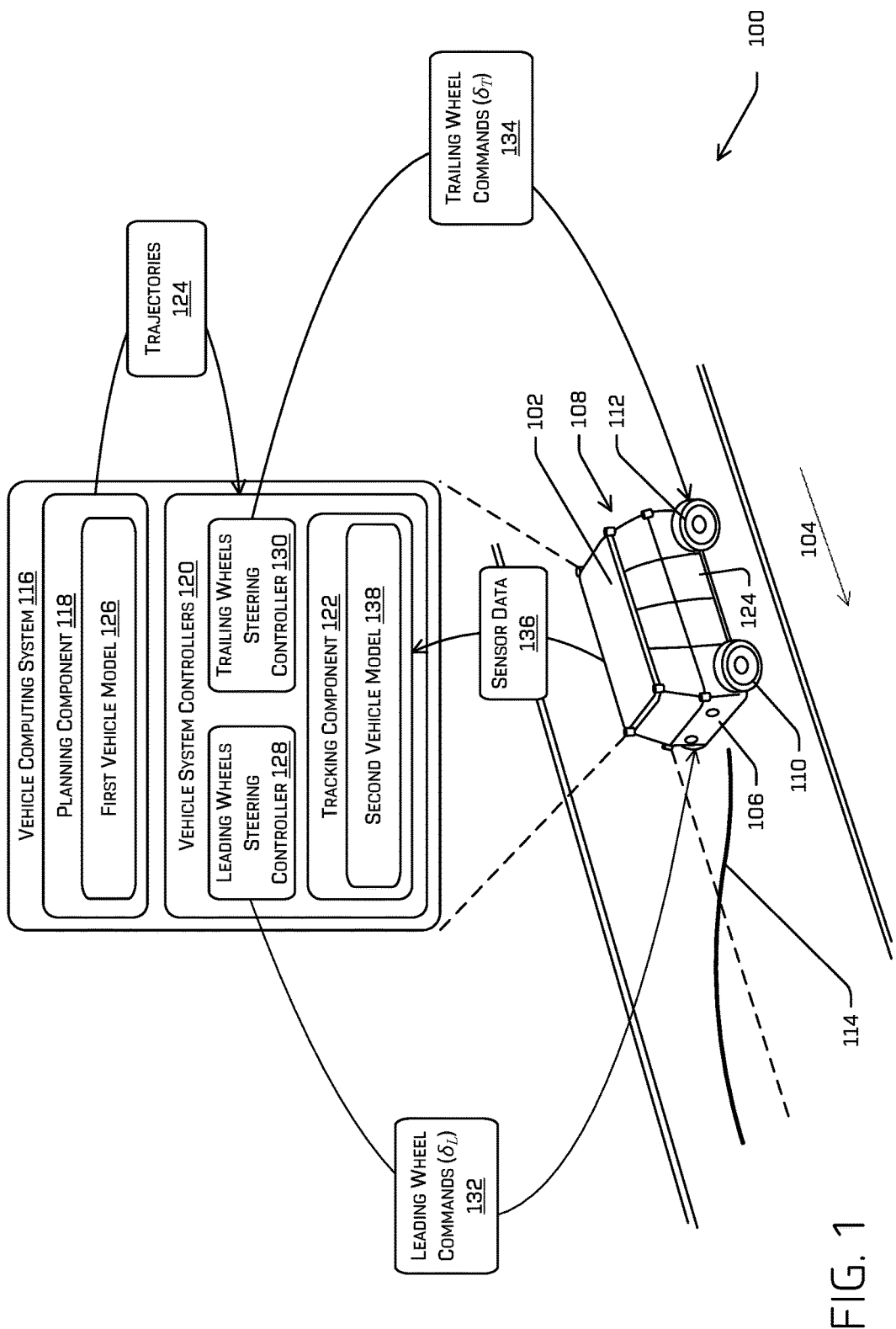
FIG. 1 includes a perspective view of an example vehicle and a schematic depiction of a portion of an example four-wheel steering system, according to aspects of this disclosure.

This disclosure is generally directed to systems and techniques for controlling steering for a vehicle. In some examples, the techniques discussed herein may include controlling steering for a first subset of wheels of the vehicle according to first controls and controlling steering for a second subset of wheels of the vehicle according to second controls. Specifically, and in some instances regardless of an orientation of the vehicle, the leading wheel can be steered according to a first steering angle and the trailing wheels can be steered according to a second steering angle, e.g., independently of the first steering angle.

Examples of this disclosure include one or more vehicle computing systems executing a planning component to determining one or more trajectories for the four-wheel steering capable vehicle. For instance, the planning component may determine trajectories using a kinematic vehicle model. The kinematic vehicle model may assume zero lateral velocity, that is, no sideslip for the vehicle, at a point representing the vehicle. The point may be equidistant from a first axle through the leading wheels of the vehicle and a second axle through the trailing wheels of the vehicle. Using this kinematic vehicle model, the planning component may determine a first steering angle for leading wheels of the vehicle to navigate to a destination, e.g., based on a current state of the vehicle. In examples, the planning component can determine a series of vehicle states, including leading wheel steering angles, as a trajectory. The kinematic vehicle model assumes zero lateral velocity, and thus implicitly that the trailing steering angle is the additive inverse of the leading steering angle. Stated differently, the kinematic vehicle model assumes mirrored steering for the vehicle, e.g., about a lateral axis through the point representing the vehicle.

Also in aspects of this disclosure, the vehicle computing system(s) can cause the vehicle to execute the trajectories determined by the planning component. For instance, the vehicle computing system(s), e.g., executing a tracking system, can generate one or more of feedforward steering angles, feedback steering angles, and limit steering angles to determine a leading wheel steering angle and a trailing wheel steering angle to execute the trajectories. In implementations, the vehicle includes a first steering controller for controlling steering of the leading wheels, e.g., according to the leading wheel steering angle, and a second steering controller for controlling steering of the trailing wheels, e.g., according to the trailing wheel steering angle.

In aspects of this disclosure, the tracking system can determine the leading and trailing wheel steering angles based at least in part on a dynamic model of the vehicle. Thus, while the planning component may use a first, kinematic model of the vehicle to determine trajectories, the tracking system may use a second, dynamic model of the vehicle to control the vehicle to follow the trajectories. Like the first model, the dynamic model may also assume zero lateral velocity, or zero sideslip of the vehicle to determine the leading and trailing steering angles. In examples, the tracking component, executing the dynamic model, may determine a feedforward command based on a current state of the vehicle relative to a state determined by the trajectory. The tracking component may also determine a feedback command based at least in part on a tracking error of the vehicle, e.g., one or more differences between a current state of the vehicle and the trajectory. In at least some examples, the tracking error includes a lateral offset and/or a heading error. The dynamic model may determine the leading steering angle and the trailing steering angle as steering angles to eliminate the tracking error.

In some instances, the leading and trailing steering angles may also be based at least in part on a ratio between the trailing steering angle and the leading steering angle. For example, at relatively lower velocities, a ratio of the trailing steering angle to the leading steering angle may be negative. At lower speeds, the negative ratio may provide greater maneuverability. At relatively higher velocities, a ratio of the trailing steering angle to the leading steering angle may be positive. At high speeds, the positive ratio may provide greater stability.

Also in aspects of this disclosure, the tracking component can determine altered leading and/or trailing steering angles, e.g., when controlling the vehicle according to zero sideslip is not possible. For instance, the leading wheels may have a first maximum steering angle and the trailing wheels may have a second maximum steering angle. When the tracking system generates leading and/or steering commands that exceed the first and/or second maximum steering angle(s), such steering angles cannot be practicably executed. Accordingly, in some implementations, the tracking system may also generate one or more corrective terms to alter the determined leading and/or trailing steering angles. As noted above, the tracking system may determine the leading and trailing steering angles based on eliminating sideslip or zero lateral velocity. In contrast, the tracking system may ease this constraint when one or both of the leading steering angle and/or the trailing steering angle would otherwise exceed the respective first or second maximum steering angle, to find the corrective steering term(s).

Systems and techniques described herein can provide many benefits. For instance, the four-wheel steering systems described herein can provide increased functionality relative to two-wheel steering systems. For instance, at lower speeds four-wheel steering systems can provide greater maneuverability, e.g., by providing a higher effective turning radius. At relatively higher speeds, four-wheel steering systems can provide great stability during steering. Because of these benefits, a passenger experience, including safety outcomes, can be improved. The systems and techniques can also be readily integrated into existing vehicles. For example, while existing autonomous vehicles may be controlled using two-wheel steering, and thus the control infrastructure of such vehicles is developed for two-wheel steering, the systems and techniques described herein can be readily integrated into these existing systems. For instance, because of the modeling techniques used in aspects of this disclosure, the logic and programming associated with existing systems can readily implement four-wheel steering. Other features and benefits are also apparent from the following description.

The techniques and systems described herein may be implemented in a number of ways. Example implementations are provided below with reference to the figures.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially- or fully-autonomous.

The example vehicle 102 may be any configuration of vehicle, such as, for example, a van, a sport utility vehicle, a cross-over vehicle, a truck, a bus, an agricultural vehicle, or a construction vehicle. The vehicle 102 may be powered by one or more internal combustion engines, one or more electric motors, hydrogen power, any combination thereof, and/or any other suitable power sources. In the illustrated example, the vehicle 102 is generally travelling in the direction indicated by arrow 104. Accordingly, a first end 106 of the vehicle 102 is a front or leading end, and an opposite, second end 108 of the vehicle 102 is a rear or trailing end. The example vehicle also includes two leading wheels 110 (of which only one is labelled) and two trailing wheels 112 (of which only one is labelled. Although the example vehicle 102 has four wheels 104, the systems and methods described herein may be incorporated into vehicles having fewer or a greater number of wheels and/or tires.

In implementations of this disclosure, the vehicle 102 has four-wheel steering, such that both the leading wheels 110 and the trailing wheels 112 are steerable independently, e.g., relative to each other and/or relative to the vehicle 102. The four-wheel steering may facilitate bi-directionality, such that the vehicle 102 may operate generally with equal performance characteristics in all directions. For instance, as shown in FIG. 1, the first end 106 of the vehicle 102 is the front end of the vehicle 102 when travelling forward in the direction shown by the arrow 104, but the vehicle 102 may also travel forward in the opposite direction, e.g., with the first end 106 as the rear end of the vehicle 102. Similarly, the second end 108 of the vehicle 102 is the rear end of the vehicle 102 when travelling in the direction of the arrow 104, and the second end 108 is the front end of the vehicle 102 when travelling forward in the direction that is the opposite of the arrow 104.

In some conventional vehicles that include four-wheel steering, the vehicle 102 may still be controlled generally as a vehicle with two-wheel steering. For instance, when the first end 106 is the front or leading end, as in FIG. 1, the leading wheels 110 may be steered, whereas the trailing wheels 112 are fixed. Similarly, when the second end 108 is the leading end of the vehicle 102, the leading wheels 110 may be fixed and the trailing wheels 112 may be steered. However, aspects of this disclosure involve steering both the leading wheels 110 and the trailing wheels 112 to provide true four-wheel steering. Specifically, in the illustration of FIG. 1, both the leading wheels 110 and the trailing wheels 112 are steering the vehicle 102 to maintain a heading along a path 114, e.g., to implement a lane-change. The path 114 can be a visualization associated with a trajectory along which the vehicle 102 is to travel, as detailed further herein. In some instances, using four-wheel steering as shown in FIG. 1 can provide added stability, e.g., at higher speeds. Four-wheel steering may also facilitate greater maneuverability, for example, by increasing an effective turning radius of the vehicle 102 in small spaces or crowded environments.

FIG. 1 also includes a block diagram of an example vehicle computing system 116 used to implement four-wheel steering at the vehicle 102. For example, the vehicle computing system 116 includes a planning component 118, vehicle system controllers 120, and a tracking component 122. For ease of understanding, components of the vehicle computing system 116 are shown and described as separate components, although aspects of the illustrated components may be shared and/or additional components may be included for carrying out functionality described herein and attributed to the illustrated components.

The planning component 118 is generally configured to generate trajectories 124. For example, the planning component 118 of the vehicle 100 may include instructions stored on a memory that, when executed by processor(s), configure the processor(s) to generate data representative of one or more trajectories of the vehicle 102. The planning component 118 can receive data representing a location of the autonomous vehicle 100 in its environment and other data, such as local pose data, and the planning component 118 can use such data to generate the trajectories 124. Individual of the trajectories 124 may include a position or pose to which the planning component 118 instructs the vehicle 102 to move, e.g., along the path 114. For instance, the trajectories 124 can include one or more vehicle states at one or more locations along the path 114. In some examples, the planning component 118 may also be configured to determine projected positions and/or poses, e.g., as additional trajectories, predicted to be executed by the autonomous vehicle 102. In some examples, the planning component 118 may substantially continuously (e.g., every 1 or 2 milliseconds) generate a plurality of potential trajectories with which to control the autonomous vehicle 102 and may select the trajectories 124 from these candidate trajectories. The selection may be based at least in part on a desired destination, a current route, a drive mode, a current vehicle trajectory, and/or object trajectory data (e.g., of one or more objects in the environment 100). Upon generating and/or selecting the trajectories 124, the planning component 116 may transmit the trajectories 124 to the vehicle system controllers 120, e.g., as a reference trajectory command to control the autonomous vehicle 102.

As illustrated in FIG. 1, the planning component 118 includes a first vehicle model 126, and the first vehicle model 126 is used to determine the trajectories 124. In examples, the first vehicle model 126 is a kinematic model of the autonomous vehicle 102. The kinematic model may be chosen for its relative simplicity, which allows for the planning component 118 to generate the trajectories 124 at a relatively high frequency and with relatively reduced computational resources. As detailed further herein, the first vehicle model 126 may be based on an assumption that the vehicle has a single point of zero lateral velocity. In conventional two-wheel steering vehicles, a point centered between the trailing wheels on an axis extending between the axes of rotation of the trailing wheels may be the point of zero lateral velocity. However, in a four-wheel steering vehicle, such as the vehicle 102, because the trailing wheels 112 also are steerable, the point centered therebetween does not have zero lateral velocity. Instead, according to aspects of this disclosure, the first vehicle model 126 may be based at least in part on a model in which the point of zero velocity is centered laterally, as in conventional two-wheel steering models, but is also centered longitudinally between a first axis extending through the leading wheels 110 and a second axis extending through the trailing wheels 112.

Assuming a wheelbase of the vehicle 102 is the distance between the first axis and the second axis, just described, the first vehicle model 126 assumes a two-wheel steering model for a vehicle having half the actual wheelbase of the vehicle 102. Accordingly, conventional planning programming and systems, e.g., for two-wheel (front-wheel) steering vehicles, can be implemented for the four-wheel steering of the vehicle 102 by modeling the vehicle 102 as having half its actual wheelbase. Implicitly, this model assumes that the vehicle 102 has mirrored steering about a lateral axis at the half-wheelbase. That is, in the first vehicle model 126, if the leading wheels are turned 10-degrees in a first direction, the trailing wheels would be turned 10-degrees in the opposite direction.

The trajectories 124 are generated by the planning component 118 based on the first vehicle model 126. For instance, the planning component 118 may receive a current state of the vehicle, e.g., including a steering angle of the leading wheels 110. The planning component 118, using the first vehicle model 126, can determine an updated leading wheel steering angle and an acceleration for the vehicle 102 to perform as desired, e.g., to attain a desired destination or state. Moreover, by integrating the steering and acceleration commands forward, additional vehicle states can be determined for future times. Thus, the trajectories 124 can include information about one or more of these vehicle states, e.g., position(s) of the vehicle 102, yaw rate(s) associated with the vehicle 102 at the position(s), velocity(ies) at the position(s), or the like, as well as the steering commands and acceleration commands associated with the positions. In examples of this disclosure, the steering commands may include only steering commands for the leading wheels, only steering commands for the trailing wheels, or steering commands for both the leading wheels and the trailing wheels. In examples, however, only the leading steering angles may be included in the trajectories 124. As noted above, in implementations of the first vehicle model 126, the rear steering commands are the opposite, e.g., the additive inverse, of the front steering commands. Accordingly, by outputting only the front steering angle, functionality of the planning component 118 can be similar to that of a conventional planning system used for two-wheel steering. Accordingly, the techniques described herein for four-wheel steering may be integrated into existing two-wheel steering architectures with minimal change to that architecture. Additional details of the functionality of the planning component 118 are described further below in connection with FIG. 3. Moreover, other vehicle models may be used as the first vehicle model 126, including models in which the trailing steering angle is not necessarily the additive inverse.

The vehicle system controllers 120 can receive the trajectories 124 and perform actions to implement the trajectories 124. Specifically, the vehicle system controllers 120 may include instructions stored on a memory that, when executed, cause any number of controllers to control aspects of the vehicle 102. FIG. 1 specifically shows a leading wheels steering controller 128 and a trailing wheels steering controller 130. As described herein, the vehicle 102 is configured for four-wheel steering, such that the leading wheels 110 are steerable independently of the trailing wheels 112, and vice versa. Accordingly, and as illustrated, the leading wheels steering controller 128 is configured to generate one or more leading wheel commands 130, e.g., as leading wheels steering angles $\delta_L$ for the leading wheels 110, and the trailing wheels steering controller 130 is configured to generate one or more trailing wheels commands 134, e.g., as trailing wheels steering angles $\delta_T$ for the trailing wheels 112.

Although FIG. 1 shows the vehicle system controllers 120 as including only the leading wheels steering controller 128 and the trailing wheels steering controller 130, the vehicle system controllers 112 will include additional controllers for controlling additional aspects of the vehicle 102. Without limitation, and as discussed above, the trajectories 124 may include information about an acceleration of the vehicle 102. A not-illustrated controller of the vehicle system controllers 120 may control an acceleration of the vehicle 102. Thus, in some implementations, the vehicle system controllers 120 may receive the trajectories 124 generated by the planning component 118 and control aspects of the vehicle 102 to implement the trajectories 124. As noted above, in some implementations of this disclosure, the trajectories 124 may include only leading wheels steering commands, e.g., corresponding to the leading wheels steering angle $\delta_L$. The first vehicle model 126 implicitly assumes the trailing wheels steering angle $\delta_T$ to be the additive inverse of the leading wheels steering angle $\delta_L$, so in some examples, the trailing wheels steering controller 130 may generate trailing wheel commands 134 to cause the trailing wheels 112 to mirror, e.g. about a lateral axis of the vehicle 102, the steering instructed by the leading wheel commands 132. However, in some examples it may be desirable to have the trailing wheels 112 steered other than opposite the leading wheels 110. In the illustration of FIG. 1, the trailing wheels 112 are steered at approximately the same angle as the leading wheels 110.

In some instances, the vehicle system controllers 120, and more specifically, the leading wheels steering controller 128 and/or the trailing wheels steering controller 130, may be configured to determine the leading wheels commands 132 and/or the trailing wheel commands 134 from the trajectories 124. In other implementations, however, the tracking component 122 may include functionality to continuously execute the trajectories 124, e.g., by generating tracking commands, as the leading wheel commands 132 and/or the trailing wheel commands 134 in response to real-time or near real-time data from the vehicle 102, e.g., received and/or generated as sensor data 136.

The tracking component 122 is generally configured to determine whether the vehicle 102 is properly executing the trajectories 124. For example, the tracking component 122 of the vehicle 102 may include instructions stored on a memory that, when executed by processor(s), configure the processor(s) to determine how to implement the trajectories 124 and calculate deviations from target states of the vehicle 102, e.g., the vehicle states provided in the trajectories 124. In examples, the tracking component 122 can receive the sensor data 136 and determine whether the vehicle 102 comports with a target heading, a target steering angle, a target steering rate, a target position, a target velocity, a target acceleration, and/or other target conditions. Moreover, the tracking component 122 can determine corrective actions to account for detected variations from the target condition(s). Although the tracking component 122 can be configured to determine and/or correct for any target conditions, aspects of this disclosure may be particularly directed to determining four-wheel steering commands, e.g., the leading wheel commands 132 and the trailing wheel commands 134, to correct for steering-related or tracking errors, such as heading, lateral offset, or the like.

As illustrated in FIG. 1, the tracking component 122 can implement a second vehicle model 138 to determine the leading wheel commands 132 and the trailing wheel commands 134. More particularly, the second vehicle model 138 may be a dynamic vehicle model that generates leading wheels steering angles ($\delta_L$) and trailing wheels steering angles ($\delta_T$) based on current position, vehicle orientation, or the like, e.g., as determined from the sensor data 136. As detailed further herein, the second vehicle model 138 may determine the steering angles ($\delta_L$, $\delta_T$) as a summation of a feedforward term and a feedback term, as constrained by vehicle and/or safety limitations. Additional details of the tracking component 122 are disused further below in detail, including with reference to FIG. 4.

Figure 2:
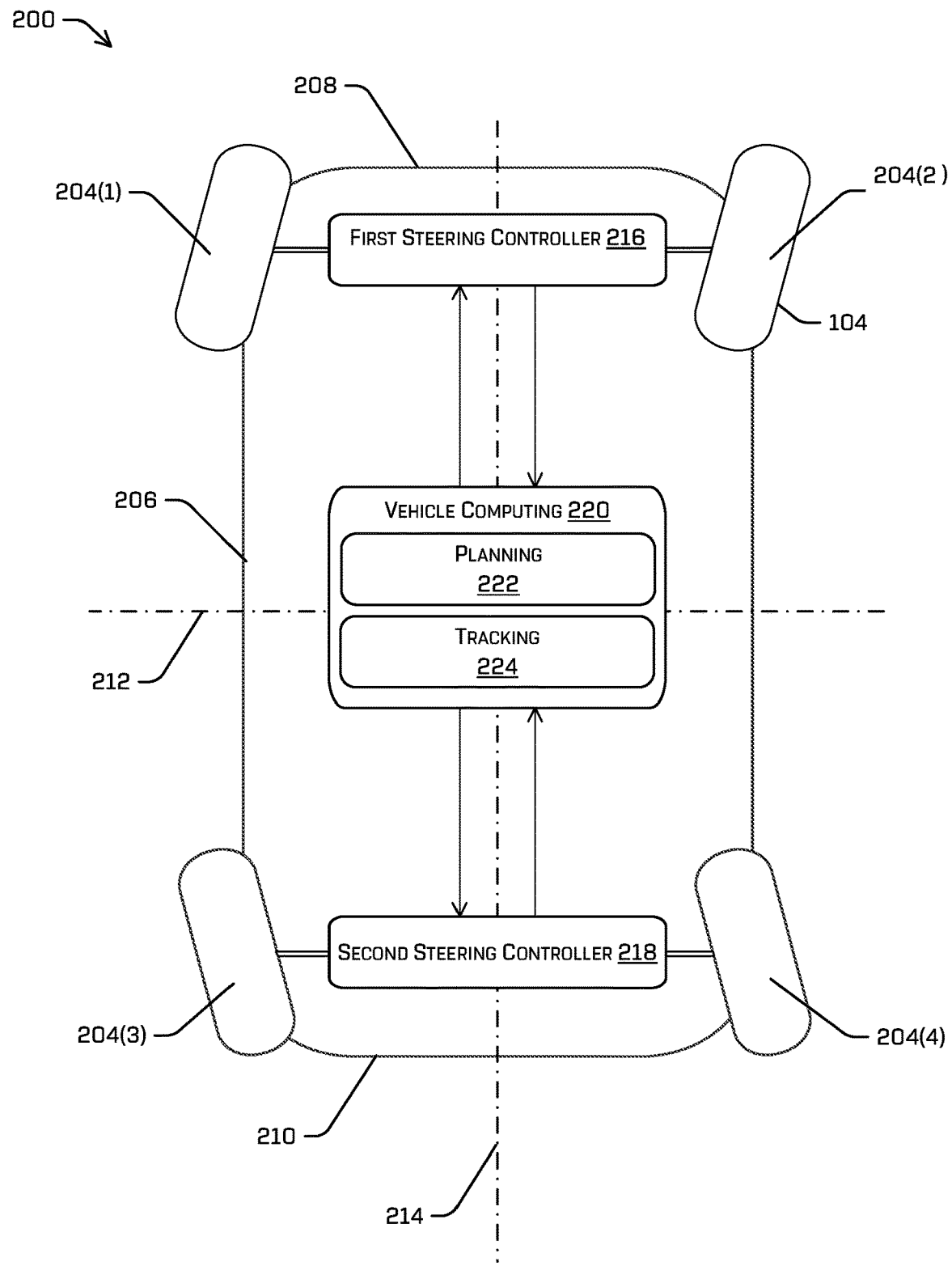
FIG. 2 is a schematic top view of an example vehicle including an example steering control system, according to aspects of this disclosure.

FIG. 2 is a schematic top view of an example vehicle 200, which may correspond to the example vehicle 102 shown in FIG. 1. As illustrated, the example vehicle 200 includes a first wheel 204(1), a second wheel 204(2), a third wheel 204(3), and a fourth wheel 204(4) (collectively, herein, "the wheels 204") arranged proximate corners of the vehicle 200. For instance, a frame 206 of the vehicle 200 may define a generally rectangular shape, with the wheels 204 arranged proximate corners thereof. More specifically, the first wheel 204(1) and the second wheel 204(2) are relatively closer to a first end 208 of the vehicle and the third wheel 204(3) and the fourth wheel 204(4) are relatively closer to an opposite, second end 210 of the vehicle 200. In the example, the first wheel 204(1) and the second wheel 204(2) are spaced a first distance from a lateral axis 212 of the vehicle 200 and the third wheel 204(3) and the fourth wheel 204(4) are spaced an equal distance from the lateral axis 212. Moreover, the first wheel 204(1) and the second wheel 204(2) are equidistant from a longitudinal axis 214 of the vehicle 200. Similarly, the third wheel 204(3) and the fourth wheel 204(4) are equidistant from the longitudinal axis 214.

As also illustrated in FIG. 2, the vehicle 200 includes a first steering controller 216 associated with the first wheel 204(1) and the second wheel 204(2) and a second steering controller 218 associated with the third wheel 204(3) in the fourth wheel 204(4). In examples, the first steering controller 216 may be one of the leading wheels steering controller 128 or the trailing wheels steering controller 130 discussed above with reference to FIG. 1. The second steering controller 218 may be the other of the leading wheels steering controller 128 and the trailing wheels steering controller 130.

Although the first steering controller 216 is illustrated as being associated with both the first wheel 204(1) and the second wheel 204(2), and the second steering controller 218 is illustrated as being associated with both the third wheel 204(3) and the fourth wheel 204(4), this is for example only. In other examples, each of the wheels 204 may have its own steering controller. Although implementations of this disclosure include implementing a first steering angle for leading wheels of a vehicle, such as the vehicle 200, and a second steering command for trailing wheels of the vehicle, such controls may be implemented through individual steering controllers at the wheels. Moreover, by controlling each of the wheels 204 independently of all other wheels, the vehicle 200 may be provided with greater maneuverability. Without limitation, while the vehicle 200 is intended to generally move forward in either direction along the longitudinal axis 214, in other instances, the vehicle may move generally forward in either direction along the lateral axis 212. Such maneuverability may be facilitated by executing a first steering angle at the second wheel 204(2) and the fourth wheel 204(4) and a second steering angle at the first wheel 204(1) and the third wheel 204(3).

The vehicle 200 also includes a vehicle computing system 220, which may be the same as or similar to the vehicle computing system 116 discussed above in connection with FIG. 1. As schematically illustrated, the vehicle computing system 220 can include a planning component 222 and a tracking component 224. The planning component 222 may include the same functionality as the planning component 118, and the tracking component 224 may include the same functionality as the tracking component 122, discussed above. The vehicle computing system 220 may be in communication with the first steering controller 216 and the second steering controller 218, e.g., to provide control commands and/or to receive information from the respective steering controllers.

As detailed herein, the planning component 222 may be configured to determine trajectories, like the trajectories 124, using a first model of the vehicle 200. In some examples, the first model is a kinematic vehicle model and is used to determine a series of vehicle states for the vehicle 200. These states are passed to the tracking component 224, which, along with the first steering controller 216 and the second steering controller 218, implement the trajectories. In examples, the tracking component 224 can determine a first steering angle, e.g., to be implemented by the first steering controller 216 at the first wheel 204(1) and the second wheel 204(2), and a second steering angle, e.g., to be implemented by the second steering controller 216 at the third wheel 204(3) and the fourth wheel 204(4). The tracking component 224 may implement a second vehicle model, e.g., a dynamic vehicle model, to determine the first and second steering angles. In examples, the second model can be applied iteratively to continuously update the steering angles, e.g., in real-time or near real-time.

Figure 3:
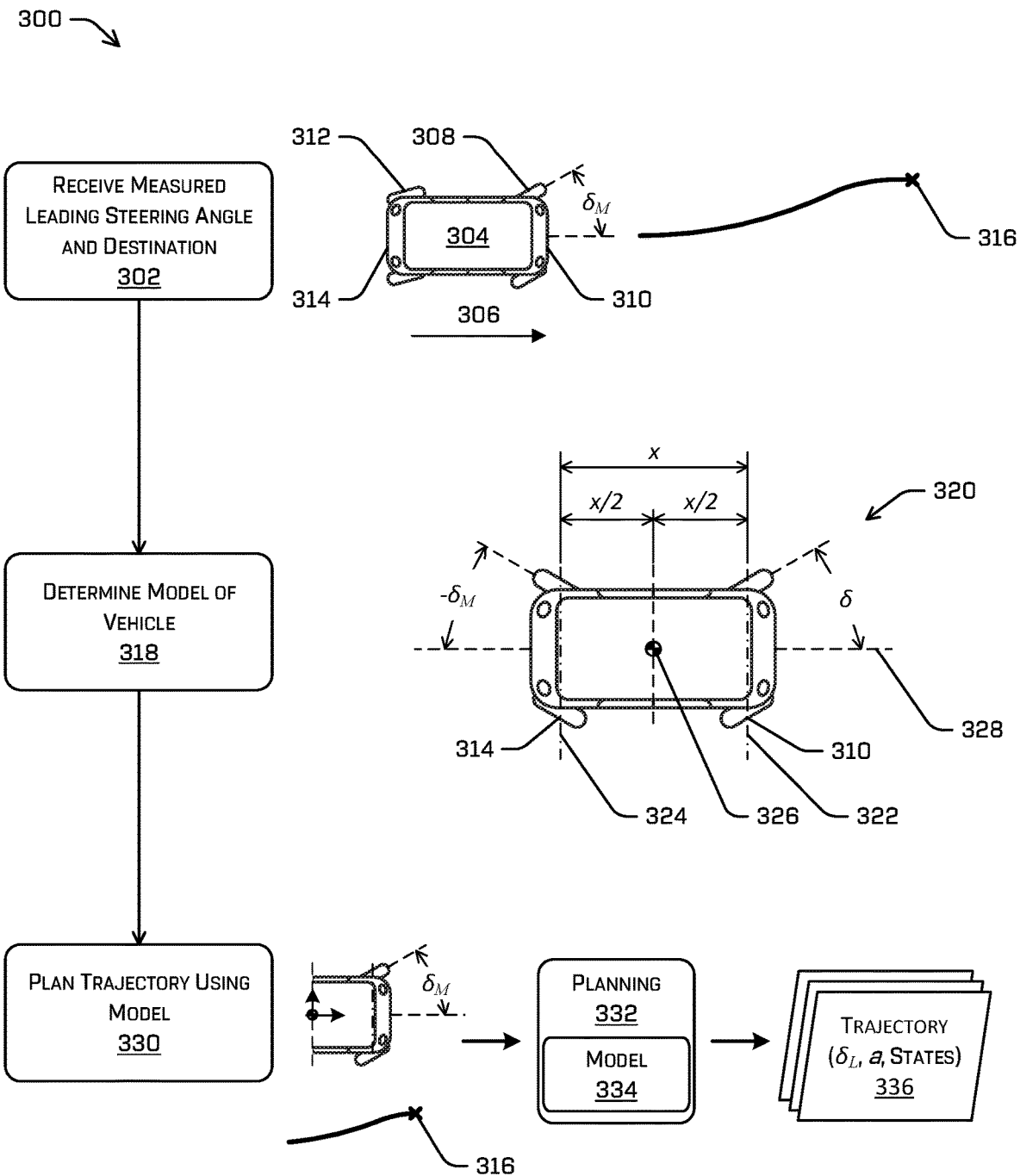
FIG. 3 is a textual and visual flow diagram of an example sequence of determining trajectories based on a four-wheel steering model of a vehicle, according to aspects of this disclosure.

FIG. 3 represents an example process 300 for generating a trajectory for an autonomous vehicle. In particular, FIG. 3 includes textual and graphical flowcharts illustrative of the process 300, according to implementations of this disclosure. In some examples, the process 300 can be implemented using components and systems illustrated in FIG. 1 and/or FIG. 2 and described above, such as the planning component 118 and/or the planning component 222, although the process 200 is not limited to being performed by such components. Moreover, the components and systems of FIGS. 1 and 2 are not limited to performing the process 300.

In more detail, the process 300 can include, at an operation 302, receiving a measured leading steering angle and a destination for the vehicle. For example, sensors at the wheels of a vehicle can generate a measurement of the steering angle of the leading wheels and the vehicle can include one or more computing systems that generate a planned path along which the vehicle is to travel. In an example accompanying the operation 302, a vehicle 304 is an autonomous vehicle, which may the vehicle 102 and/or the vehicle 200 described above. As illustrated in the example, the vehicle 304 is generally travelling in the direction indicated by arrow 306. Accordingly, the vehicle 304 includes leading wheels 308 proximate a first (leading) end 310 of the vehicle 304 and trailing wheels 312 proximate a second (trailing) end 314 of the vehicle 304. The example accompanying the operation 302 also illustrates a destination 316 and an example path along which the vehicle 304 is to travel to reach the destination 316. In examples, the planned path may be determined using information from a localization system, a perception system, a prediction system, and/or other aspects of a planning system in place on the vehicle 304 or accessible by the vehicle 304. The planned path may be a desired route along which the vehicle 304 is to travel in an environment, such as the environment 100 discussed above. In this example, the planned path is illustrated as a continuous line having varied curvature. In operation, the vehicle 304 may be controlled to maintain a centered position on the planned path. However, the planned path is not limited to the path illustrated. In some examples, the planned path may be an envelope or other shape having a width, e.g., laterally relative to the illustrated path and which the lateral extents of the vehicle 304 are to maintain during operation of the vehicle 304. As used herein, a planned path is generally understood to be a segment or area relative to which the vehicle 304 is to travel. For instance, the planned path may be determined to avoid obstacles or objects in an environment of the vehicle 304, including but not limited to other vehicles, pedestrians, or the like, to maintain the vehicle 304 and a lane or other segment defined by a road or drivable surface, or to otherwise guide the vehicle 304.

As also illustrated in the example accompanying the operation 302, the leading wheels 308 are angled relative to the direction indicated by the arrow 306. More specifically, the leading wheels 308 are angled relative to a longitudinal axis of the vehicle by a steering angle, $\delta_M$. The steering angle may be measured using conventional sensors or other means associated with the leading wheels 308, a steering system associated with the leading wheels 308, or otherwise. Accordingly, the steering angle $\delta_M$ is the actual, current angle at which the leading wheels 308 are steered. In the example accompanying the operation 302, the trailing wheels 312 are also steered relative to the longitudinal axis of the vehicle 304. In this instance, the trailing wheels 312 are steered at a different, e.g., smaller angle than the steering angle $\delta_M$ measured at the leading wheels 310. However, the steering angle associated with the trailing wheels 312 may not be used in the process 300.

At an operation 318, the process 300 includes determining a model of the vehicle. For example, because the vehicle 304 includes independent steering for the leading wheels 308 and the trailing wheels 312, the vehicle model for determining trajectories for the vehicle 304 is different from a model used to determine trajectories of a vehicle configured for front-wheel steering only. An example accompanying the operation 318 illustrates aspects of a representation 320 of the vehicle 304, and the representation 320 is illustrative of some aspects of a mathematical model used to generate trajectories, as described herein. The mathematical model may be the first vehicle model 126 discussed above. The mathematical model may be a kinematic model of the vehicle 304.

The representation 320 conceptualizes aspects of the model. More specifically, the representation a distance between the first axis 322 and the second axis 324 is a wheelbase of the vehicle 304, represented by x in the example. As illustrated, the representation 320 also includes a point 326 that is equally spaced, e.g., in the longitudinal direction, between the first axis 322 and the second axis 324. The point 326 is also disposed along a longitudinal axis 328 of the vehicle 304. As also shown in the example accompanying the operation 318, the representation 320 shows a steering angle $\delta$ associated with the leading wheels 310. Moreover, the trailing wheels are indicated as being disposed at the steering angle $-\delta$, that is, the negative or opposite of the steering angle $\delta$ of the leading wheels. In implementations of this disclosure, the mathematical model used to determine trajectories uses only the leading steering angle (as received at the operation 302) the front or leading end of the vehicle and determines only a front steering angle for inclusion in the trajectories, as described herein. The model assumes that the point 326 is a point at which the vehicle 304 has zero lateral velocity. Accordingly, the model implicitly includes mirrored steering, as shown in the representation 320. That is, the trailing wheels are mirrored relative to a lateral axis of the vehicle 304.

At an operation 330, the process 300 includes planning a trajectory using the model. For example, a planning component implements the mathematical model to determine one or more future vehicle states for following the planned path to the destination 316. In the example of FIG. 3, a planning component 332 receives the measured leading steering angle, $\delta_M$, and the destination 316, and executes a model 334 to determine a trajectory 336. The planning component 332 may also receive additional information about the vehicle 304 to execute the model 334 to determine the trajectory 336. Without limitation, the planning component can receive information about a current pose of the vehicle, e.g., a current position of the vehicle 304, a current velocity of the vehicle 304, a current acceleration of the vehicle 304, a current yaw rate of the vehicle 304, in addition to the current leading steering angle, $\delta_M$, and determine, using the kinematic model 334, the trajectory 336 as one or more leading wheel steering angles, $\delta_L$, one or more accelerations for the vehicle, and one or more vehicle states. For instance, the planning component 332, using the model 334, can determine a leading wheel steering angle, $\delta_L$, and an acceleration for the vehicle 304, e.g., as vehicle commands, and integrate those commands forward using the model 334 over some predetermined time period to determine a plurality of vehicle states (e.g., positions (for instance, of the point 326), velocities, yaw rates, and/or other characteristics) as the trajectory. For example, the trajectory may include a plurality of steering commands, acceleration commands, and vehicle states determined at a frequency.

The model 334, as represented by the representation 320, may be readily integrated into planning architectures that also are configured for use in vehicles configured for two-wheel steering. For instance, because the model 334 is a kinematic model based on a point of zero lateral velocity, e.g., the point 326, the model 334 may be used for other vehicle types at which a point of zero lateral velocity can be identified. In some examples, trajectories can be determined for a vehicle configured only for two-wheel, e.g., the leading wheels, steering by identifying the point of zero lateral velocity at a point centrally-located on the rear wheel axis. In this example, the trailing steering angle will always be zero, so a kinematic model could be implemented with the point of zero velocity between the trailing wheels. Although not illustrated in FIG. 3, the trajectory 336 may be forwarded to a vehicle controller, for implementation.

Figure 4:
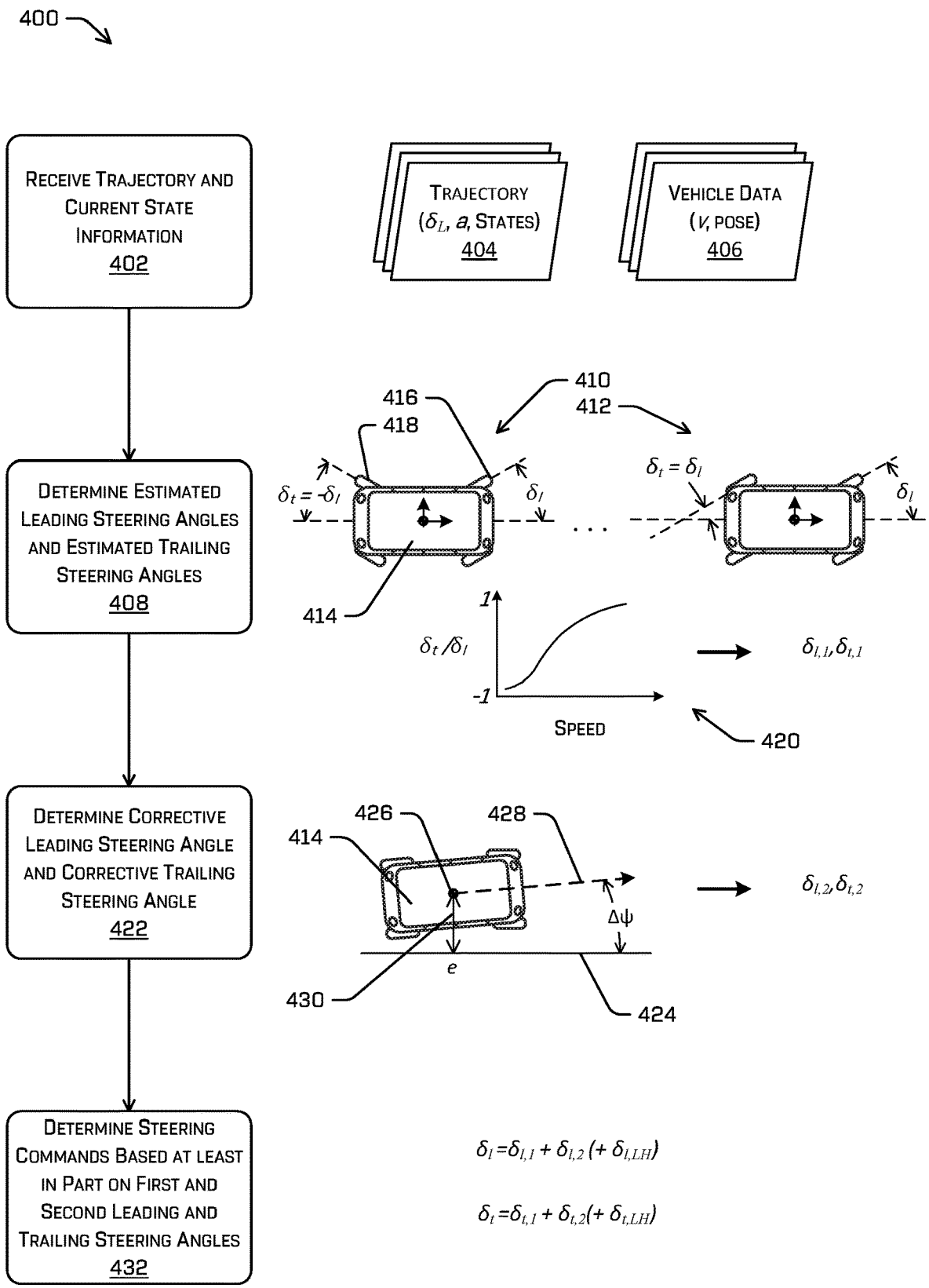
FIG. 4 is a textual and visual flow diagram of an example sequence of controlling a vehicle to follow a trajectory using four-wheel steering, according to aspects of this disclosure.

FIG. 4 represents an example process 400 for executing a trajectory at an autonomous vehicle using four-wheel steering. In particular, FIG. 4 includes textual and graphical flowcharts illustrative of the process 400, according to implementations of this disclosure. In some examples, the process 400 can be implemented using components and systems illustrated in FIG. 1 and/or FIG. 2 and described above, such as the tracking component 122 and/or the tracking component 224, although the process 400 is not limited to being performed by such components. Moreover, the components and systems of FIGS. 1 and 2 are not limited to performing the process 400.

At an operation 402, the process 400 includes receiving a trajectory and current state information. A graphical example accompanying the operation 402 includes a graphical representation of a trajectory 404 and of vehicle data 406. In the illustration, the trajectory 404 includes a leading wheels steering angle, $\delta_L$, an acceleration, a, and one or more vehicle states, although the trajectory 404 may include any additional or different information. The trajectory may be the trajectory 336 generated by the process 300 discussed above, although the process 400 is not limited to using the trajectory 336. The vehicle data may include current information about the vehicle, including information of a current pose of the vehicle, such as the current velocity, yaw, position, yaw rate, or the like. The state information may be defined at a center of gravity of the vehicle.

At an operation 408, the process 400 includes determining first leading steering angles and first trailing steering angles. As described, this disclosure generally relates to four-wheel steering, in which two leading wheels (such as the leading wheels 110) are steered independently of two trailing wheels (such as the trailing wheels 112). Thus, the leading wheels are steered according to a leading wheel steering angle, $\delta_l$, and the trailing wheels are steered according to a trailing wheel steering angle, $\delta_t$. The operation 408 may be associated with determining a feedforward steering command, whereas the operation 422, discussed in more detail below, may be associated with determining a feedback command.

An example accompanying the operation 408 illustrates a first representation 410 and a second representation 412 of a vehicle 414 to demonstrate steering angle ratios for determining first leading steering angle $\delta_{l,1}$, and a first trailing steering angle $\delta_{t,1}$. More specifically, in both the first representation 410 and the second representation 412, leading wheels 416 of the vehicle 414 are steered at a leading steering angle $\delta_l$, and trailing wheels 418 of the vehicle 414 are steered at a trailing steering angle $\delta_t$. In the first representation 410, the trailing wheels 418 mirror the leading wheels 416 about a longitudinal axis of the vehicle 414. Accordingly, the trailing steering angle $\delta_t$ is the additive inverse of the leading steering angle $\delta_l$ or, stated differently, $\delta_t = -\delta_l$ in the first representation 410 and a ratio of the leading trailing steering angle to the leading steering angle is −1. In the second representation 412, the trailing steering angle $\delta_t$ and the leading steering angle $\delta_l$ are equal. Accordingly, the ratio of the leading steering angle to the trailing steering angle is 1. The first representation 410 and the second representation 412 illustrate only two states of the vehicle 414; the trailing wheels 418 may be steered at any ratio to the leading wheels 416, e.g., any ratio between −1 and 1.

In aspects of this disclosure, the operation 408 includes determining a first leading steering angle $\delta_{l,1}$, and a first trailing steering angle $\delta_{t,1}$ based at least in part on the ratio of the trailing steering angle to the leading steering angle. For instance, at relatively lower speeds, a negative ratio of $\delta_t/\delta_l$ may provide increased maneuverability, e.g., as a higher turning radius, without sacrificing stability. On the contrary, at relatively higher speeds, a positive ratio of $\delta_t/\delta_l$ may provide increased stability in steering, e.g., during lane changes and/or cornering. A graphical representation 420 demonstrates an example plot of the ratio of $\delta_t/\delta_l$ that may be used, at least in part, to determine the first leading steering angle $\delta_{l,1}$, and the first trailing steering angle $\delta_{t,1}$.

In examples of this disclosure, the operation 408 may determine the first leading steering angle $\delta_{l,1}$, and the first trailing steering angle $\delta_{t,1}$ based at least in part on a dynamic model of the vehicle. In one example, the dynamic model may be based at least in part on a steady state single track, e.g., a bicycle model, with a nonlinear Fiala tire model. A lateral bicycle model has two vehicle states—yaw rate γ and sideslip β. Because the leading wheels and the trailing wheels are independently steerable, the dynamic model has two unknowns and the two vehicle states. The first leading steering angle $\delta_{l,1}$, and the first trailing steering angle $\delta_{t,1}$ can be determined for desired vehicle states and using tire slip equations, e.g., according to the following equations (1) and (2):

$$\delta_{l,1} = ak - \alpha_l \quad (1)$$

$$\delta_{t,1} = bk - \alpha_t \quad (2)$$

In Equations (1) and (2), a is the distance from the center of mass of the vehicle to a first axis extending through the leading wheels rotational axis (e.g., a distance along a longitudinal direction), b is the distance from the center of mass of the vehicle to a second axis extending through the trailing wheels rotational axis, k is a curvature of a path to be followed, e.g., the planned path 114 or the planned path 316, and α is a slip angle. More specifically, the slip angles may be derived from a leading and trailing tire lateral force assuming a static weight distribution and steady state force balance, e.g., based on lateral acceleration, lateral force at the leading and trailing wheels and a mass of the vehicle. The forces may be obtained from a tire curve given by a nonlinear tire model to determine the tire slip angles. In some implementations, the tire model may be a Fiala tire model, which requires only two parameters—cornering stiffness C and friction μ, both of which are measured from vehicle data, such as the vehicle data 406.

At an operation 422, the process 400 includes determining second leading steering angles and second trailing steering angles. For example, the operation 408 may determine expected steering angles of a vehicle model to track a desired path, the operation 422 may compare a current state of the vehicle to the path, e.g., where the vehicle should be along the path, and determine corrective steering commands. These corrective steering commands include a second leading steering angle $\delta_{l,2}$, and a second trailing steering angle $\delta_{t,2}$. An example accompanying the operation 422 illustrates a current state of the vehicle 414 relative to a planned path 424. The planned path 424 may be the planned path 114 and/or the planned path 316. As also illustrated in the example, the vehicle 414 has a center of mass 426 and is travelling in a longitudinal direction illustrated by the arrow 428. A distance between the center of mass 426 and the planned path 424 is a lateral offset, e, designated by an arrow 430. The arrow 430 is perpendicular to the planned path 424. The example accompanying the operation 422 also illustrates an offset angled Δψ, which is an angular offset between the planned path 424 and the actual heading of the vehicle 414. Stated differently, e represents a lateral error and Δψ represents a heading error of the vehicle 414, which together represent a tracking error.

The operation 422 includes using the lateral error and the heading error to determine the second leading steering angle $\delta_{l,2}$, and the second trailing steering angle $\delta_{t,2}$. More specifically, the operation 422 can include solving Equations (3) and (4):

$$\delta_{l,2} = -k_1 e - k_2 \Delta\psi \quad (3)$$

$$\delta_{t,2} = -k_3 e - k_4 \Delta\psi \quad (4)$$

In Equations (3) and (4), the terms $k_1$, $k_2$, $k_3$, and $k_4$ are proportional gains.

At an operation 432, the process 400 includes determining steering commands based at least in part on the first and second leading and trailing steering angles. As described herein, the operation 408 determines the first leading steering angle $\delta_{l,1}$, and the first trailing steering angle $\delta_{t,1}$ based on a dynamic model of the vehicle, e.g., as estimated or feedforward commands, and the operation 422 determines the second leading steering angle $\delta_{l,2}$, and the second trailing steering angle $\delta_{t,2}$ based on measured errors, e.g., as corrective or feedback commands. In examples, the operation 432 can determine a leading wheels steering angle, $\delta_l$, and a trailing wheels steering angle $\delta_t$, as a sum including the first and second leading wheels steering angles and the first and second trailing wheels steering angles, respectively. In examples, the leading wheels steering angle, $\delta_l$, and the trailing wheels steering angle, $\delta_t$, are determined using Equations (5) and (6):

$$\delta_l = \delta_{l,1} + \delta_{l,2} + \delta_{l,LH} \quad (5)$$

$$\delta_t = \delta_{t,1} + \delta_{t,2} + \delta_{t,LH} \quad (6)$$

Thus, according to Equations (5) and (6), the commanded leading wheels steering angle is a sum of the leading wheels steering angle determined from a dynamic model of the vehicle 414, e.g., at the operation 408, and the leading wheels steering angle determined from state errors of the vehicle 414, e.g. at the operation 422. Similarly, the trailing wheels steering angle is a sum of the trailing wheels steering angle determined from the dynamic model and the trailing wheels steering angle determined from the state errors. Equations (5) and (6) also include a third term, i.e., $\delta_{l,LH}$ and $\delta_{t,LH}$. These third terms are limit handling terms and account for situations in which the determined leading wheels steering angle and/or the trailing wheels steering angle calculated from the first steering angles and the second steering angles cannot be implemented at the vehicle. For instance, steering of the leading wheels and/or the trailing wheels can be limited to some maximum steering angle and the limiting handling terms can include modification angles that modify the calculated leading and/or trailing steering angles, as detailed herein. The maximum steering angle may be based on the physical capabilities of the vehicle and/or based on a predetermined or desired constraint applied to the vehicle, e.g., regardless of the actual capabilities of the vehicle. For instance, the maximum steering angles may be determined based on preferred performance characteristics, passenger comfort, or other parameters.

Figure 5:
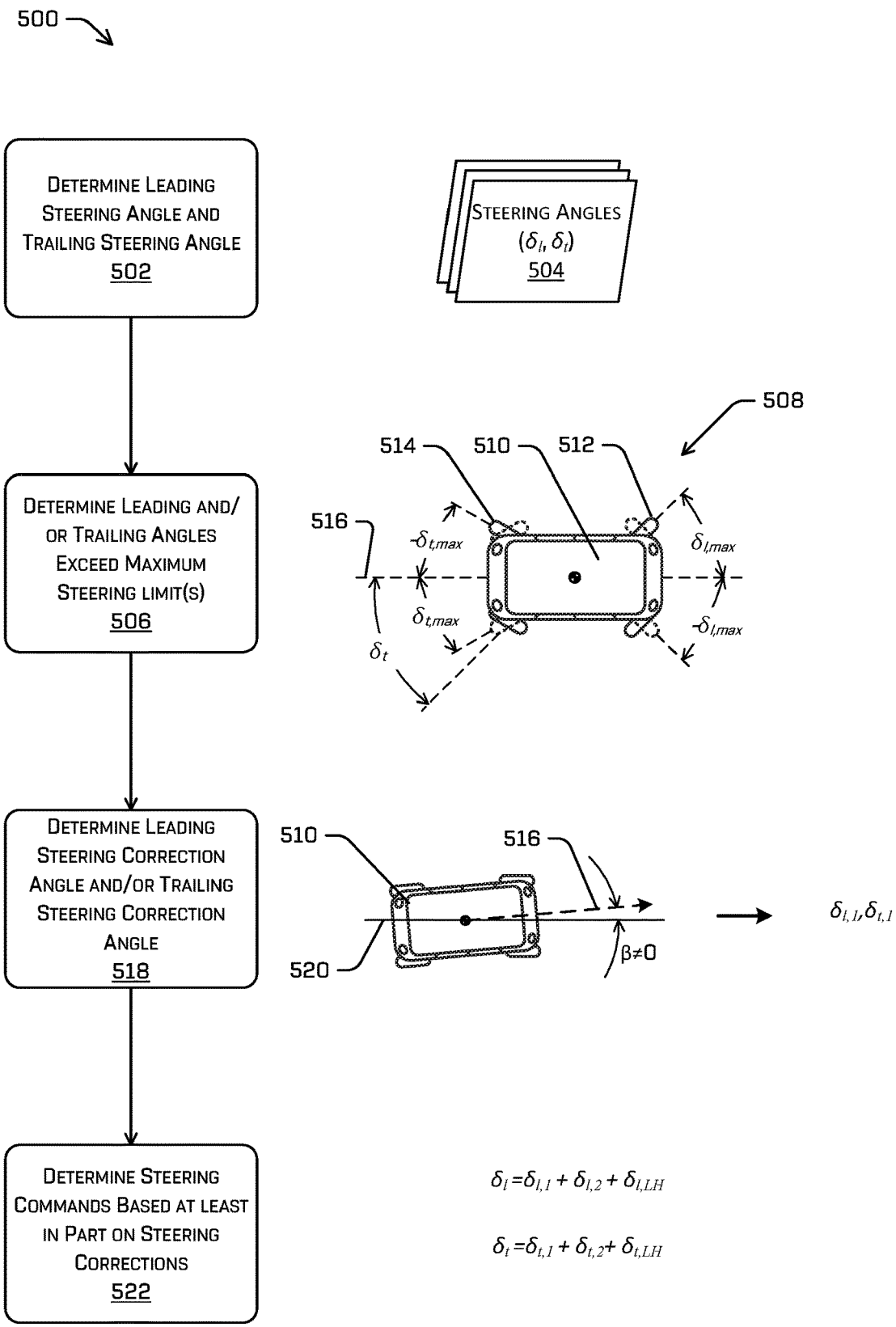
FIG. 5 is a textual and visual flow diagram of an example sequence for determining steering commands with limit steering constraints, according to aspects of this disclosure.

FIG. 5 represents an example process 500 for executing a trajectory at an autonomous vehicle using four-wheel steering. In particular, FIG. 5 includes textual and graphical flowcharts illustrative of the process 500, according to implementations of this disclosure. The process 500 may be performed along with the process 400, e.g., the processes 400, 500 may be component processes of an overall process for executing a trajectory. In some examples, the process 500 can be implemented using components and systems illustrated in FIG. 1 and/or FIG. 2 and described above, such as the tracking component 122 and/or the tracking component 224, although the process 500 is not limited to being performed by such components. Moreover, the components and systems of FIGS. 1 and 2 are not limited to performing the process 500.

At an operation 502, the process 500 includes determining a leading steering angle and a trailing steering angle. For instance, the operation 502 can include performing the process 400 to estimate front and rear steering angles based on a dynamic model of a vehicle and altering those estimated angles using corrective steering angles based on errors calculated from a predicted path. An example accompanying the operation 502 graphically depicts steering angle data 504 comprising a leading wheel steering angle, $\delta_l$, and a trailing wheel steering angle δt.

At an operation 506, the process 500 includes determining that the leading and/or the trailing steering angles exceed maximum steering limits. An example accompanying the operation 506 includes a graphical representation 508 illustrating a vehicle 510 having leading wheels 512 and trailing wheels 514. In the representation, the leading wheels 512 are steerable relative to a longitudinal axis 516 up to a leading wheel maximum steering angle, $\delta_{l,max}$, in either direction, e.g., over a range from $\delta_{l,max}$ to $-\delta_{l,max}$ (shown in dotted lines). Similarly, the trailing wheels 514 are steerable relative to a longitudinal axis 516 up to a trailing wheel maximum steering angle, $\delta_{t,max}$, in either direction, e.g., over a range from $\delta_{t,max}$ (shown in dashed lines) to $-\delta_{t,max}$. In some examples, the leading wheel maximum steering angle may be different from the trailing wheel maximum steering angle. For instance, the trailing wheel maximum steering angle may be smaller than the leading wheel maximum steering angle. The operation 506 may include determining that one or both of the steering angles $\delta_l$, $\delta_t$ included in the steering angles data 504 (e.g., determined using the process 400) are outside the maximum steering angles, $\delta_{l,max}$, $\delta_{t,max}$, respectively.

At an operation 518, the process 500 includes determining a leading steering correction angle and/or a trailing steering correction angle. For example, the dynamic model used to determine the estimated steering angles, e.g., at the operation 408, can also be used to determine limit handling correction terms $\delta_{l,LH}$, $\delta_{t,LH}$, that can be summed with the estimated steering angles and the corrective steering angles when one or both of the steering angles are beyond the maximum limits. In more detail, the Equations (1) and (2) used to determine the estimated or feedforward angles are simplified in that they are based on the assumption that the vehicle has a steady-state heading error of zero, e.g., sideslip, $\beta$, is zero, such that the leading and trailing wheels are chosen arbitrarily. The Equations (1) and (2) can be rewritten to include the sideslip, as equations (7) and (8):

$$\delta_{l,1} = ak - \alpha_f + \beta_{ffw} + \delta_l^i \quad (7)$$

$$\delta_{t,1} = bk - \alpha_r + \beta_{ffw} + \delta_t^i \quad (8)$$

In Equations (7) and (8), $\beta_{ffw}$ is the sideslip of the vehicle and the $\delta$ terms are constant, unknown offsets.

During nominal operation, e.g., as in the process 400, when the leading and trailing wheel angles are within the steering limits of the vehicle, steady-state sideslip is set to zero, such that the vehicle will have a steady-state heading error of zero and the leading and trailing wheel angles are arbitrarily chosen. However, when one of the angles hits a limit, the process can no longer arbitrarily determine the leading and trailing steering angles. Because the tire slip terms, $\alpha$, are determined using lateral force equations, as introduced above, the required force at the saturated wheels can still be met in the saturated axle using vehicle sideslip. More specifically, the process 500 can allow a non-zero steady-state sideslip. Conceptually, and as illustrated in an example accompanying the operation 518, the longitudinal axis 516 of the vehicle 510 is angled relative to a planned path by the non-zero sideslip, $\beta$. That is, the vehicle 510 is no longer pointing tangent to the planned path 520 as in Equations 1 and 2, in which the sideslip was assumed to be zero.

In more detail, define a saturation function, sat(x,lb,ub), which bounds a value x between a lower bound, lb, and an upper bound, ub. The saturated steering angles can then be given by the Equations (9) and (10):

$$\delta_{l,1} = \text{sat}(\delta_{l,nom}, -\delta_{l,max}, \delta_{l,max}) \quad (9)$$

$$\delta_{t,1} = \text{sat}(\delta_{t,nom}, -_{t,max}, \delta_{t,max}) \quad (10)$$

For instance, the nominal leading steering angle $\delta_{l,nom}$ and the nominal trailing steering angle $\delta_{t,nom}$ may be the steering angles $\delta_l$, $\delta_t$ determined by the process 400. The steady-state sideslip is calculated using Equation (11) during leading wheel saturation:

$$\beta = \delta_{l,sat} - \delta_{l,nom} \quad (11)$$

And is calculated using Equation (12) during trailing wheel saturation:

$$\beta = \delta_{t,sat} - \delta_{t,nom} \quad (12)$$

Substituting these sideslip Equations (11) and (12) into Equations (9) and (10), respectively, yields equations (13) and (14):

$$\delta_{l,1} = \text{sat}[\delta_{l,nom} - (\delta_{t,nom} - \delta_{t,sat}), -\delta_{l,max}, \delta_{l,max}] \quad (13)$$

$$\delta_{t,1} = \text{sat}[\delta_{t,nom} - (\delta_{l,nom} - \delta_{l,sat}), -\delta_{t,max}, \delta_{t,max}] \quad (14)$$

In operation of the vehicle 510 implementing these steering angles, if both the front and the rear steer angels are saturated, the steady-state sideslip is not updated (or is set to the previously calculated value), effectively capping the calculated steady-state sideslip at the value that occurs when both steer angles saturate.

At an operation 522, the process 500 includes determining steering commands based at least in part on the steering corrections. As illustrated in the example accompanying the operation 518, the operation 518 can include determining limit handling steering angles that act to modify vehicle behavior during steering saturation. For instance, these angles may be modification angles that modify the feedback or corrective angles, e.g., determined at the operation 518 to maintain vehicle stability during steering saturation. The limit handling angles may be given by Equations (15) and (16), as follows:

$$\delta_{l,LH} = -k_{l,sat}[(\delta_{l,1} + \delta_{t,2} - \text{sat}(\delta_{t,1} + \delta_{t,2}), -\delta_{t,max}, \delta_{t,max}] \quad (15)$$

$$\delta_{t,LH} = -k_{t,sat}[(\delta_{l,1} + \delta_{l,2} - \text{sat}(\delta_{l,1} + \delta_{l,2}), -\delta_{l,max}, \delta_{l,max}] \quad (16)$$

In Equations (15) and (16), $k_{l,sat}$ and $k_{t,sat}$ are saturation gains chosen to result in stable closed-loop dynamics and desirable system performance.

The process 500 may also include integral controlling, which allows to vehicle to reject constant steering offsets as well as allow for steady-state lateral errors during a ramp steer. When the steering angles remain below their limits, the integral steering angles integrate both lateral error and the sum of heading error and steady-state sideslip. During a saturation event, the steering angels integrate only lateral error. This is consistent with functionality of some conventional two-wheel steering integral controllers. The vehicle computing system can include logic to switch between integral angles. For instance, if the there is no front saturation and no rear saturation:

$$\delta_l^i = \int [(-k_{ei,l}e - k_{\psi i,l}(\Delta\psi + \beta_{ffw})]dt \quad (17)$$

$$\delta_t^i = \int [(-k_{ei,t}e - k_{\psi i,t}(\Delta\psi + \beta_{ffw})]dt \quad (18)$$

If there is rear saturation, but not front saturation:

$$\delta_l^i = \int [-k_{f,i}^{sat}e]dt \quad (19)$$

And if there is front saturation, but not rear saturation:

$$\delta_t^i = \int [-k_{t,i}^{sat}e]dt \quad (20)$$

As will be appreciated, the integral steering angles will be included in the feedforward angles, e.g., the angles $\delta_{l,1}$, $\delta_{t,1}$.

Figure 6:
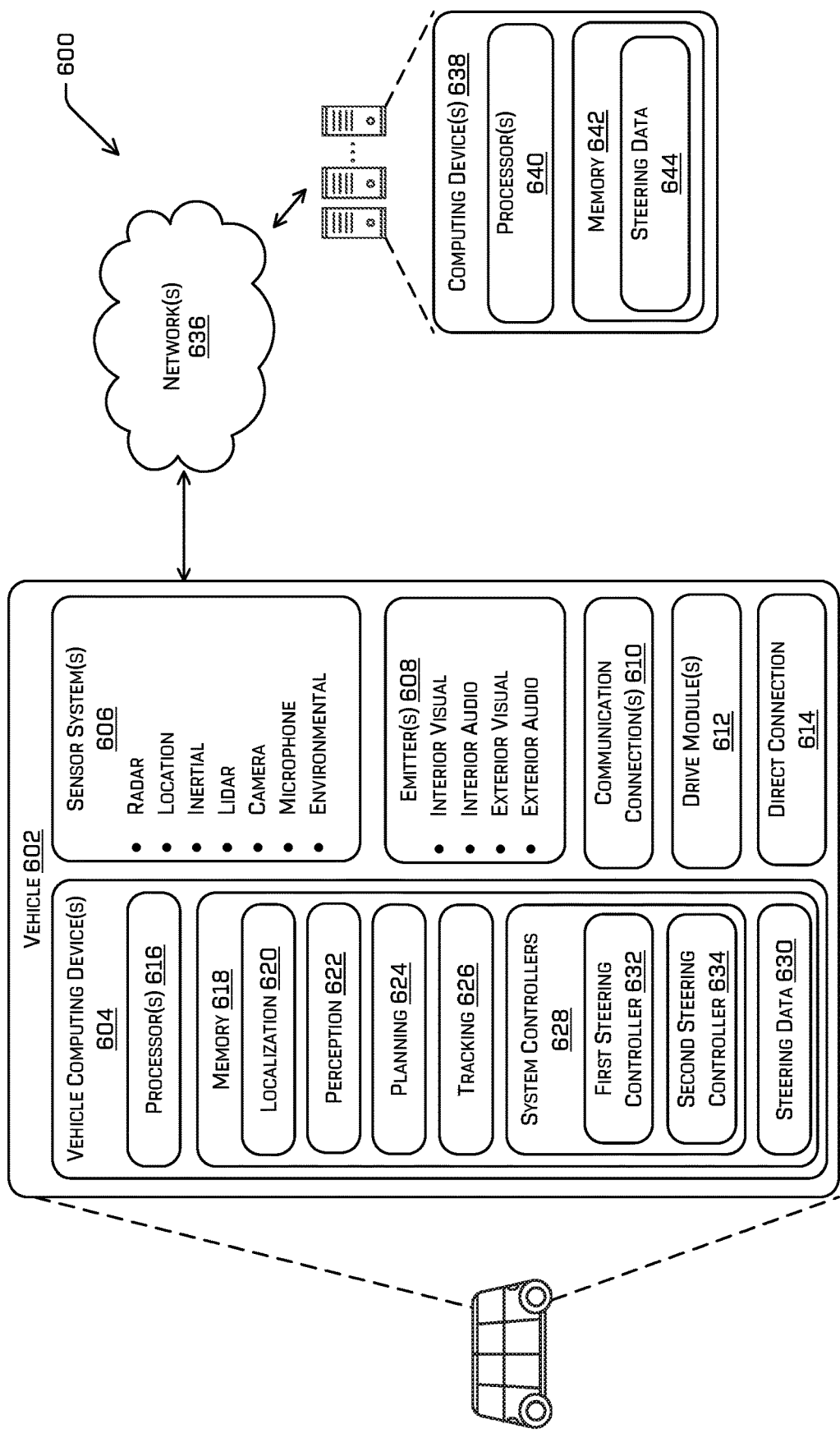
FIG. 6 is a block diagram of an example system for implementing four-wheel steering and related techniques, according to aspects of this disclosure.

FIG. 6 depicts a block diagram of an example system 600 for implementing the techniques described herein. In at least one example, the system 600 can include a vehicle 602, which may be the same as or different from the vehicle 102 shown in FIG. 1, the vehicle 200 shown in FIG. 2, the vehicle 304 shown in FIG. 3, the vehicle 414 shown in FIG. 4, and/or the vehicle 510 shown in FIG. 5. The vehicle 602 can include one or more vehicle computing devices 604, one or more sensor systems 606, one or more emitters 608, one or more communication connections 610, one or more drive modules 612, and at least one direct connection 614.

The vehicle computing device(s) 604 also include one or more processors 616 and memory 618 communicatively coupled to the one or more processors 616. In the illustrated example, the vehicle 602 is an autonomous vehicle. However, the vehicle 602 could be any other type of vehicle, or any other system having at least one sensor (e.g., a camera enabled smartphone). In the illustrated example, the memory 618 of the vehicle computing device 604 stores a localization component 620, a perception component 622, a planning component 626, a tracking component 626, system controllers 628, and steering data 630. Moreover, the system controllers 628 include first steering controller 632 and a second steering controller 634. Though depicted in FIG. 6 as residing in the memory 618 for illustrative purposes, it is contemplated that the localization component 620, the perception component 622 (and/or components thereof), the planning component 626, the tracking component 626, the system controllers 628, and the steering data 630 can additionally, or alternatively, be accessible to the vehicle 602 (e.g., stored on, or otherwise accessible by, memory remote from the vehicle 602).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 can provide data to various components of the vehicle 602, such as the planning component 626, to determine a current position of the autonomous vehicle 602 for generating a trajectory.

In some instances, the perception component 622 generally includes functionality to perform object detection, segmentation, and/or classification. In some examples, the perception component 622 can provide processed sensor data that indicates a presence of an object that is proximate to the vehicle 602 and/or a classification of the object as an object type (e.g., car, pedestrian, cyclist, animal, building, tree, road surface, curb, sidewalk, unknown, etc.). In additional and/or alternative examples, the perception component 622 can provide processed sensor data that indicates one or more characteristics associated with a detected object (e.g., a tracked object) and/or the environment in which the object is positioned. In some examples, characteristics associated with the object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 626 can determine a path for the vehicle 602 to follow to traverse through an environment. The planning component 626 can be, or include functionality ascribed to, the planning component 118 and/or the planning component 222. For example, the planning component 626 can determine various routes and trajectories and various levels of detail using a vehicle model, such as the first vehicle model 126. The planning component 626 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 626 can generate an instruction for guiding the autonomous vehicle along at least a portion of the route from the first location to the second location. In at least one example, the planning component 626 can determine how to guide the autonomous vehicle from a first waypoint in the sequence of waypoints to a second waypoint in the sequence of waypoints. In some examples, the instruction can be a trajectory, or a portion of a trajectory. The trajectory can include a series of vehicle states corresponding to the waypoints and commands for achieving those states. Such commands can include steering angles and accelerations, for example. Without limitation, the planning component 626 may receive a current steering angle, e.g., of leading wheels of a vehicle, and determine trajectories based at least in part on the steering angle using operations discussed above in association with FIG. 3. The model may be a kinematic model of the vehicle, in which the vehicle 602 is assumed to have a point of zero velocity midway between a leading axis and a trailing axis, as described herein. In some implementations, multiple trajectories can be substantially simultaneously generated (e.g., within technical tolerances) in accordance with a receding horizon technique, with one of the multiple trajectories being selected for the vehicle 602 to navigate.

The tracking component 626 includes functionality to adjust steering commands to follow a planned path, e.g., in accordance with a trajectory generated by the planning component 624. Without limitation, the tracking component 626 can be, or implement functionality ascribed to, the tracking component 122 and/or the tracking component 224. In examples, the tracking component 626 can use a vehicle model, such as a dynamic vehicle model, to generate leading wheel steering angles and trailing wheel steering angles for controlling the vehicle 602 to follow a path. In some instances, the tracking component 224 can implement the processes 400, 500 to determine the steering angles. Although the tracking component 626 is illustrated as being a separate from the system controllers 628, in some examples the tracking component 626 can be integrated into the system controllers 628.

The system controllers 628 can be configured to control steering, propulsion, braking, safety, emitters, communication, and other systems of the vehicle 602, e.g., based on controls generated by the planning component 624 and/or the tracking component 626. As illustrated, the system controllers 628 include a first steering controller 632 and a second steering controller 634. For instance, the first steering controller 632 can be used to control a steering angle of leading wheels of the vehicle 602. The second steering controller 634 can be used to control a steering angle of the trailing wheels of the vehicle, e.g., independently of the leading wheels. The system controllers 628 can communicate with and/or control corresponding systems of the drive module(s) 612 and/or other components of the vehicle 602.

The steering data 630 can be used by the vehicle 602 in association with four-wheel steering techniques, as described herein. For instance, the steering data 630 can include information about steering constraints, such as maximum steering angles and/or maximum steering rate limits, for the leading wheels and the trailing wheels. Also in implementations, the steering data 620 can include a steering command library accessible by various components of the vehicle 602 to provide steering information in different formats, adapted for those components. Without limitation, the steering data 620 can include data to select a steering angle and/or rate limits and to convert curvature and curvature rate information to front and rear steering limits in radians and radians/second, respectively, for different components. For instance, the steering data 630 can include conversion factors to facilitate such conversions. Moreover, in some instances, the steering data 620 can include information to allow for both two-wheel and four-wheel steering, e.g., for translation or conversion of information when switching from two-wheel to four-wheel steering, or vice versa. The steering data 630 may be a steering library accessible by the various components of the vehicle 602, including the localization component 620, the perception component 622, the planning component 624, the tracking component 626, and/or other components.

As can be understood, the components discussed herein (e.g., the localization component 620, the perception component 622 (and its components), the planning component 624, the tracking component 626, the system controller(s) 628, and the steering data 630) are shown and described as divided for illustrative purposes. However, the operations performed by the various components can be combined or performed in any other component.

The sensor system(s) 606 can include LiDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. As another example, the radar system can include multiple instances of the same or different radar sensors disposed at various locations about the vehicle 602. The sensor system(s) 606 can provide input to the vehicle computing device 604. Additionally or alternatively, the sensor system(s) 606 can send sensor data, via one or more networks 636, to remote computing device(s) 638 at a particular frequency, after a lapse of a predetermined period of time, in near real-time, etc.

The emitter(s) 608 can be configured to emit light and/or sound. The emitter(s) 608 in this example can include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 610 can enable communication between the vehicle 602 and one or more other local or remote computing device(s). For instance, the communication connection(s) 610 can facilitate communication with other local computing device(s) on the vehicle 602 and/or the drive module(s) 612. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communication connection(s) 610 can include physical and/or logical interfaces for connecting the vehicle computing device 604 to another computing device or a network, such as the network(s) 638. For example, the communication connection(s) 610 can enable Wi-Fi-based communication such as via frequencies defined by the IEEE 802.11 standards, short range wireless frequencies such as Bluetooth®, cellular communication (e.g., 2G, 3G, 6G, 6G LTE, 5G, etc.) or any suitable wired or wireless communications protocol that enables the respective computing device to interface with the other computing device(s).

In at least one example, the vehicle 602 can include the drive module(s) 612. In some examples, the vehicle 602 can have a single drive module 612. In at least one example, the vehicle 602 may have multiple drive modules 612 with individual of the drive modules 612 positioned on opposite ends of the vehicle 602 (e.g., the front and the rear, etc.). In at least one example, the drive module(s) 612 can include one or more sensor systems to detect conditions of the drive module(s) 612 and/or the surroundings of the vehicle 602. By way of example and not limitation, the sensor system(s) associated with the drive module(s) 612 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders can be unique to the drive module(s) 612. In some cases, the sensor system(s) on the drive module(s) 612 can overlap or supplement corresponding systems of the vehicle 602 (e.g., the sensor system(s) 606).

The drive module(s) 612 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 612 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 612. Furthermore, the drive module(s) 612 may also include one or more communication connection(s) that enable communication by the respective drive module with one or more other local or remote computing device(s).

In at least one example, the direct connection 614 can provide a physical interface to couple the drive module(s) 612 with the body of the vehicle 602. For example, the direction connection 614 can allow the transfer of energy, fluids, air, data, etc. between the drive module(s) 612 and the vehicle. In some instances, the direct connection 614 can further releasably secure the drive module(s) 612 to the body of the vehicle 602.

As also illustrated, the vehicle 602 may be in communication, via the network(s) 636 with the computing device(s) 638. For instance, the computing device(s) 638 may implement functionality described herein. In more detail, the computing device(s) 638 can include processor(s) 640 and memory 642 storing steering data 644.

The steering data 644 may include the steering data 630. For instance, the steering data 630 may be a subset of the steering data 644, which may be loaded to the vehicle 602 prior to operation of the vehicle. Without limitation, the steering data 644 may include a centralized database of steering data for a fleet of vehicles, including the vehicle 602, and the steering data 630 may be uploaded to the vehicle 602 as needed.

The processor(s) 616 of the vehicle 602 and the processor(s) 640 of the computing device(s) 638 can be any suitable processor capable of executing instructions to process data and perform operations as described herein. By way of example and not limitation, the processor(s) 616 and 640 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 and the memory 642 are examples of non-transitory computer-readable media. The memory 618 and the memory 642 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although FIG. 6 is illustrated as a distributed system, in alternative examples, components of the vehicle 602 can be associated with the computing device(s) 638 and/or components of the computing device(s) 638 can be associated with the vehicle 602. That is, the vehicle 602 can perform one or more of the functions associated with the computing device(s) 638, and vice versa. Further, aspects of the perception system 622 and/or the tracking component 626 can be performed on any of the devices discussed herein.

Figure 7:
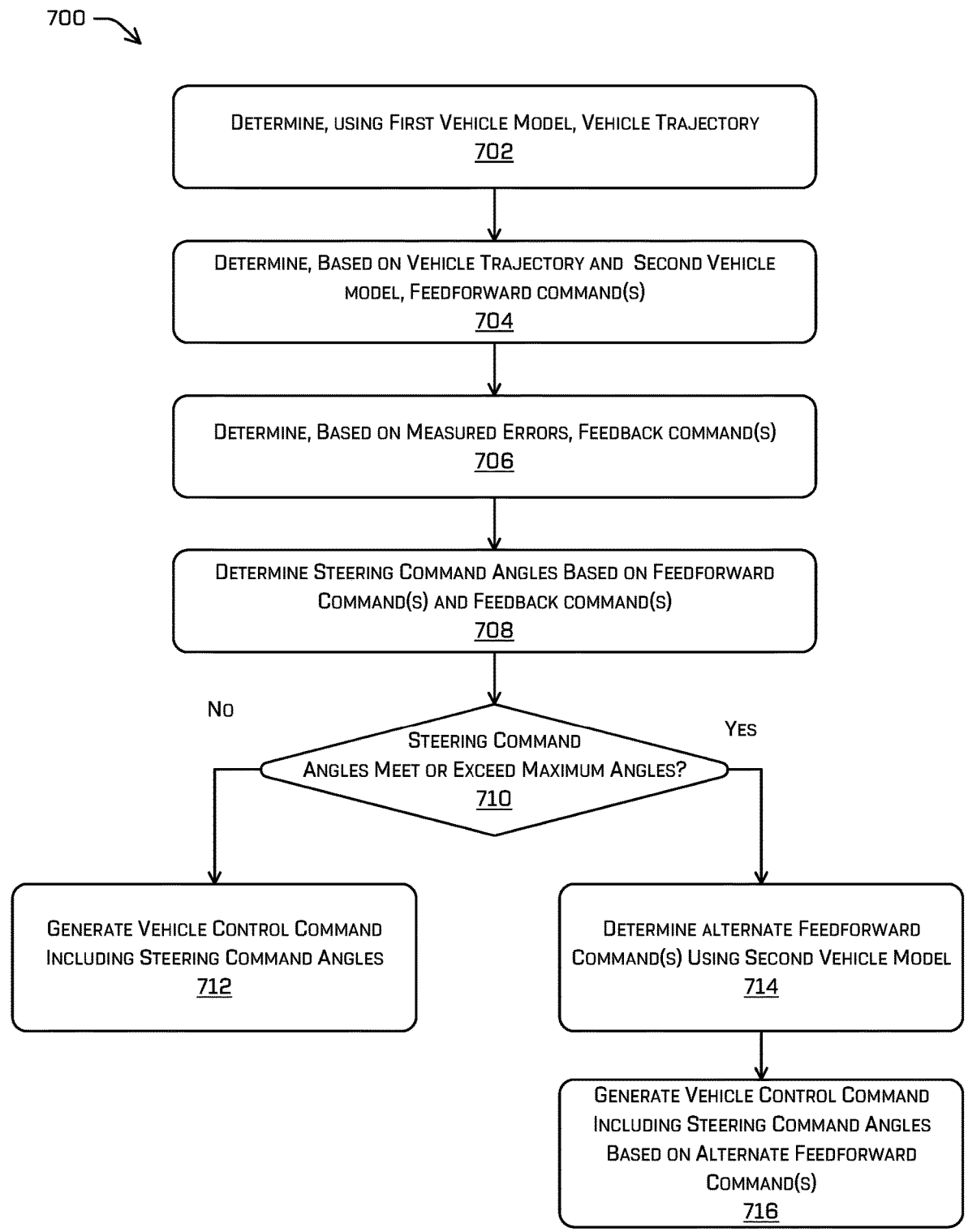
FIG. 7 is a flow diagram of an example process for controlling a vehicle using four-wheel steering, according to aspects of this disclosure.

FIG. 7 illustrates an example processes 700 to perform techniques discussed herein. The process 700 (as well as aspects of the processes 300, 400, 500 described herein) are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The process 700 may be performed by any device or component, including those of the vehicle 602. However, the vehicle 602 is not limited to performing the operations of the process 700.

In more detail, the process 700 includes, at an operation 702, determining, using a first vehicle model, a vehicle trajectory. For example, the first vehicle model may be a kinematic model of a vehicle that approximates four-wheel steering for the vehicle using mirrored steering. The operation 702 can determine the trajectory based at least in part on a desired path along which the vehicle is to travel and a current, e.g., measured, leading wheel steering angle. The operation 702 may include aspects of the process 300, for example.

At an operation 704, the process 700 includes determining, based on the vehicle trajectory and a second vehicle model, one or more feedforward commands. For instance, the operation 704 can include determining an estimated leading wheel steering angle and an estimated trailing wheel steering angle for executing the trajectory, based on a dynamic model of the vehicle. The operation 704 can include aspects of the process 400, including the operation 408, for example.

At an operation 706, the process 700 includes determining, based on measured errors, one or more feedback commands. For example, the operation 706 can include determining a tracking error, e.g., one or both of a lateral error and a heading error, and generating a front steering angle and a rear steering angle for correcting for these errors. The operation 704 can include aspects of the process 400, including the operation 422, for example.

At an operation 708, the process 700 includes determining steering command angles based on the feedforward command(s) and the feedback command(s). For example, the steering command angles can include a leading wheels steering angle and a trailing wheels steering angle. The leading wheels steering angle may be the sum of the feedforward leading steering angle determined at the operation 704 and the feedback leading steering angle determined at the operation 706, and the trailing wheels steering angle may be the sum of the feedforward leading steering angle determined at the operation 704 and the feedback trailing steering angle determined at the operation 706.

At an operation 710, the process 700 includes determining whether the steering command angles meet or exceed maximus angles. For example, the leading wheels may have a first maximum steering angle and the trailing wheels may have a second maximum steering angle. The first maximum steering angle and the second maximum steering angle may be the same or different.

If, at the operation 710 it is determined that the steering command angles do not meet or exceed the maximum angles, at an operation 712 the process 700 includes generating a vehicle control command including the steering command angles. For instance, the command may cause the leading vehicle wheels to be controlled at the leading steering angle and the trailing steering angle determined at the operation 708. In some instances, the leading steering angle and the trailing steering angle may be modified to comport with preferred steering ratios, steering rates, or the like.

Alternatively, if, at the operation 710 it is determined that the steering command angles meet or exceed the maximum angles, at an operation 714, the process 700 includes determining one or more alternate feedforward commands using the second vehicle model. For example, the operation 704 may apply the first vehicle model by assuming certain conditions. For example, the operation 704 may assume that the vehicle has no sideslip. In contrast, the operation 714 may be determine the feedforward commands based on a non-zero sideslip, e.g., since one or both of the leading wheels steering angle and the trailing wheels steering angle may be constrained to the maximum steering angle. Allowing some sideslip will allow for determination of alternate steering angles that are both within the respective maximum steering angles.

At an operation 716, the process 700 includes generating a vehicle control command including the steering command angles. For instance, the command may cause the leading vehicle wheels to be controlled at a leading steering angle that is the sum of a leading steering angle determined from the alternate feedforward commands determined at the operation 714 and the feedback commands determined at the operation 706. The command may also cause the trailing vehicle wheels to be controlled at a trailing steering angle that is the sum of a trailing steering angle determined from the alternate feedforward commands determined at the operation 714 and the feedback commands determined at the operation 706. In some instances, the leading steering angle and the trailing steering angle may be modified to comport with preferred steering ratios, steering rates, or the like.

Example Clauses

A. An example autonomous vehicle includes leading wheels disposed proximate a leading end of the autonomous vehicle, the leading wheels configured to steer relative to a longitudinal axis of the autonomous vehicle; trailing wheels disposed proximate a trailing end of the autonomous vehicle, the trailing wheels configured to steer relative to the longitudinal axis and independently of the leading wheels; one or more processors; and memory storing instructions that, when executed by the one or more processors, cause the autonomous vehicle to perform actions comprising: receiving, at a planning component, a destination to which the autonomous vehicle is to travel; receiving, at the planning component, a current vehicle state of the autonomous vehicle; determining, using a model of the autonomous vehicle and based at least in part on the destination and the current vehicle state, a commanded steering angle for the leading wheels of the autonomous vehicle, the model configured such that a first steering angle of the leading wheels results in a second steering angle of the trailing wheels that is the additive inverse of the first steering angle; determining, based at least in part on the reference path and the commanded steering angle, a trajectory of the autonomous vehicle; and controlling the autonomous vehicle based at least in part on the trajectory.

B. The autonomous vehicle of example A, wherein the model is a kinematic model of the autonomous vehicle and the commanded steering angle is based at least in part on a current position of the autonomous vehicle.

C. The autonomous vehicle of example A or example B, wherein the position of the autonomous vehicle is a point associated with the autonomous vehicle characterized in the kinematic model as having zero lateral velocity.

D. The autonomous vehicle of any one of example A through example C, wherein: the autonomous vehicle has a first axis associated with the leading wheels and a second axis associated with the trailing wheels; and the point is equidistant from the first axis and the second axis along a longitudinal axis extending from a leading end of the autonomous vehicle to a trailing end of the autonomous vehicle.

E. The autonomous vehicle of any one of example A through example D, wherein the model of the autonomous vehicle is a first model and the controlling the autonomous vehicle based at least in part on the trajectory comprises: determining, based at least in part on a second vehicle model, a first steering angle for the leading wheels and a second steering angle for the trailing wheels, the first model and the second model assuming the autonomous vehicle has no sideslip; controlling, with a first steering controller, the leading wheels according to the first steering angle; and controlling, with a second steering controller, the trailing wheels according to the second steering angle.

F. The autonomous vehicle of any one of example A through example E, wherein the second model is a dynamic model of the vehicle and determining the first steering angle and the second steering angle comprises: determining a first estimated steering angle for the leading wheels and a second estimated steering angle for the trailing wheels; and determining, based at least in part on a tracking error of the autonomous vehicle, a first corrective steering angle for the leading wheels and a second corrective steering angle for the trailing wheels, wherein the first steering angle is based at least in part on the first estimated steering angle and the first corrective steering angle and the second steering angle is based at least in part on the second estimated steering angle and the second corrective steering angle.

G. An example method includes receiving a reference path along which an autonomous vehicle is to travel; receiving a current steering angle associated with the leading wheels of the autonomous vehicle; determining, using a model of the autonomous vehicle and based at least in part on the reference path and the current steering angle, a commanded steering angle for the leading wheels of the autonomous vehicle, the model configured such that a first steering angle of the leading wheels results in a second steering angle of trailing wheels of the vehicle that is the additive inverse of the first steering angle; and determining, based at least in part on the reference path and the commanded steering angle, a trajectory of the autonomous vehicle.

H. The method of example G, wherein the model is a kinematic model of the autonomous vehicle and the commanded steering angle is based at least in part on a current position of the autonomous vehicle.

I. The method of example G or example H, wherein the position of the autonomous vehicle is a point associated with the autonomous vehicle characterized in the kinematic model as having zero lateral velocity.

J. The method of any one of example G through example I, wherein the autonomous vehicle has a first axis associated with the leading wheels and a second axis associated with the trailing wheels; and the point is equidistant from the first axis and the second axis along a longitudinal axis extending from a leading end of the autonomous vehicle to a trailing end of the autonomous vehicle.

K. The method of any one of example G through example J, wherein the trajectory comprises a vehicle state and the commanded steering angle for the leading wheels of the autonomous vehicle, the trajectory excluding a steering angle for the trailing wheels.

L. The method of any one of example E through example K, wherein the model of the autonomous vehicle is a first model and the controlling the autonomous vehicle based at least in part on the trajectory comprises: determining, based at least in part on a second vehicle model, a first steering angle for the leading wheels and a second steering angle for the trailing wheels; controlling, with a first steering controller, the leading wheels according to the first steering angle; and controlling, with a second steering controller, the trailing wheels according to the second steering angle.

M. The method of any one of example G through example L, wherein the first steering angle and the second steering angle are based at least in part on a ratio of the second steering angle to the first steering angle and the ratio is: a negative ratio when a current speed of the vehicle is below a first threshold speed; and a positive ratio when the current speed is above a second threshold speed.

N. The method of any one of example G through example M, wherein the second model is a dynamic model of the vehicle and determining the first steering angle and the second steering angle comprises: determining a first estimated steering angle for the leading wheels and a second estimated steering angle for the trailing wheels; and determining, based at least in part on a tracking error of the autonomous vehicle, a first corrective steering angle for the leading wheels and a second corrective steering angle for the trailing wheels, wherein the first steering angle is based at least in part on the first estimated steering angle and the first corrective steering angle and the second steering angle is based at least in part on the second estimated steering angle and the second corrective steering angle.

O. The method of any one of example G through example N, wherein: the determining the trajectory of the autonomous vehicle comprises determining one or more vehicle states; and the first corrective steering angle and the second corrective steering angle are based at least in part on a tracking error between a current state of the vehicle and a vehicle state of the one or more vehicle states.

P. The method of any one of example G through example O, wherein: the tracking error comprises a lateral offset and an angular offset; and the determining the first corrective steering angle and the second corrective steering angle is based at least in part on minimizing the lateral offset and the angular offset.

Q. One or more example non-transitory computer-readable media storing instructions that, when executed by one or more processors, perform actions comprising: receiving a reference path along which an autonomous vehicle is to travel; receiving a current steering angle associated with the leading wheels of the autonomous vehicle; determining, using a model of the autonomous vehicle and based at least in part on the reference path and the current steering angle, a commanded steering angle for the leading wheels of the autonomous vehicle, the model configured such that a first steering angle of the leading wheels results in a second steering angle of trailing wheels of the vehicle that is the additive inverse of the first steering angle; and determining, based at least in part on the reference path and the commanded steering angle, a trajectory of the autonomous vehicle.

R. The non-transitory computer-readable media of example Q, wherein the model is a kinematic model of the autonomous vehicle and the commanded steering angle is based at least in part on a current position of the autonomous vehicle, the position of the autonomous vehicle being a point characterized in the kinematic model as having zero lateral velocity.

S. The non-transitory computer-readable media of example Q or example R, wherein: the autonomous vehicle has a first axis associated with the leading wheels and a second axis associated with the trailing wheels; and the point is equidistant from the first axis and the second axis along a longitudinal axis extending from a leading end of the autonomous vehicle to a trailing end of the autonomous vehicle.

T. The non-transitory computer-readable media of any one of example Q through example S, wherein the model of the autonomous vehicle is a first model and the controlling the autonomous vehicle based at least in part on the trajectory comprises: determining, based at least in part on a second vehicle model, a first steering angle for the leading wheels and a second steering angle for the trailing wheels; controlling, with a first steering controller, the leading wheels according to the first steering angle; and controlling, with a second steering controller, the trailing wheels according to the second steering angle.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A vehicle comprising:
   a leading wheel disposed proximate a leading end of the vehicle;
   a trailing wheel disposed proximate a trailing end of the vehicle;
   one or more processors; and
   memory storing instructions that, when executed by the one or more processors, cause the vehicle to perform actions comprising:
      receiving a reference path along which the vehicle is to travel;
      determining, using a model of the vehicle and based at least in part on the reference path and a speed of the vehicle, a first commanded steering angle for steering the leading wheel and a second commanded steering angle for steering the trailing wheel,
      wherein a ratio of the first commanded steering angle and the second commanded steering angle is a negative ratio when the speed is below a first threshold speed, and the ratio is a positive ratio when the speed is above a second threshold speed; and
      controlling the vehicle based at least in part on the first commanded steering angle and the second commanded steering angle.

2. The vehicle of claim 1, the second commanded steering angle is an additive inverse of the first commanded steering angle.

3. The vehicle of claim 1, wherein the first commanded steering angle is based at least in part on a current position of the vehicle, the current position being a point of zero lateral velocity.

4. The vehicle of claim 3, wherein:
   the vehicle has a first axis associated with the leading wheel and a second axis associated with the trailing wheel; and
   the point of zero lateral velocity is equidistant from the first axis and the second axis along a longitudinal axis extending from the leading end of the vehicle to the trailing end of the vehicle.

5. The vehicle of claim 1, wherein the model of the vehicle is a first model and the controlling the vehicle comprises:
   determining, based at least in part on a second model of the vehicle, a first steering angle for the leading wheel and a second steering angle for the trailing wheel, the first steering angle and the second steering angle being determined to minimize vehicle sideslip;
   controlling, with a first steering controller, the leading wheel according to the first steering angle; and
   controlling, with a second steering controller, the trailing wheel according to the second steering angle.

6. A method comprising:
   receiving a speed of a vehicle;
   determining, using a model of the vehicle and based at least in part on the speed, a first commanded steering angle for a leading wheel of the vehicle and a second commanded steering angle for a trailing wheel of the vehicle,
   wherein a ratio of the first commanded steering angle and the second commanded steering angle is a negative ratio when the speed is below a first threshold speed, and the ratio is a positive ratio when the speed is above a second threshold speed; and
   controlling the vehicle based at least in part on the first commanded steering angle and the second commanded steering angle.

7. The method of claim 6, wherein the model is a kinematic model of a representative vehicle having half a wheelbase of the vehicle and constrained to have zero sideslip.

8. The method of claim 6, wherein the negative ratio decreases with decreasing speeds below the first threshold speed and the positive ratio increases with increasing speeds above the second threshold speed.

9. The method of claim 6, wherein the model is a first model and wherein controlling the vehicle comprises:
   determining, based at least in part on a second model of the vehicle, a first steering angle for the leading wheel and a second steering angle for the trailing wheel;
   controlling, with a first steering controller, the leading wheel according to the first steering angle; and
   controlling, with a second steering controller, the trailing wheel according to the second steering angle.

10. The method of claim 9, wherein the first model is a kinematic model and the second model is a dynamic model of the vehicle and determining the first steering angle and the second steering angle comprises:
  determining a first estimated steering angle for the leading wheel and a second estimated steering angle for the trailing wheel; and
  determining, based at least in part on a difference between a state of the vehicle and a desired state of the vehicle, a first corrective steering angle for the leading wheels and a second corrective steering angle for the trailing wheels,
  wherein the first steering angle is based at least in part on the first estimated steering angle and the first corrective steering angle and the second steering angle is based at least in part on the second estimated steering angle and the second corrective steering angle.

11. The method of claim 10, wherein the determining the first estimated steering angle and the second estimated steering angle is based at least in part on a steady state single track model constrained by zero sideslip for the vehicle.

12. The method of claim 10, wherein the determining the difference comprises:
  determining a lateral offset of the vehicle relative to a reference path; and
  determining an angular offset between a heading of the vehicle and the reference path.

13. The method of claim 12, wherein determining the first corrective steering angle and the second corrective steering angle comprises minimizing the lateral offset and the angular offset.

14. The method of claim 9, wherein the second model is a dynamic bicycle model and the first steering angle the second steering angle are determined based at least in part on:
  one or more of a cornering stiffness of a tire comprising at least one of the leading wheel or the trailing wheel and a friction coefficient for the tire, and
  a center of mass of the vehicle, a first distance from the center of mass of the vehicle to a first rotational axis associated with the leading wheel and a second distance from the center of mass of the vehicle to a second rotational axis associated with the trailing wheel.

15. One or more non-transitory computer-readable media storing instructions that, when executed by one or more processors, perform actions comprising:
  receiving a reference path along which a vehicle is to travel;
  receiving a speed of the vehicle;
  determining, using a model of the vehicle and based at least in part on the speed and the reference path, a first commanded steering angle for a leading wheel of the vehicle and a second commanded steering angle for a trailing wheel of the vehicle,
  wherein a ratio of the first and second commanded steering angles is a negative ratio, decreasing with decreasing speeds, when the speed is below a first threshold speed, and the ratio is a positive ratio, increasing with increasing speeds, when the speed is above a second threshold speed; and
  controlling the vehicle based at least in part on the first commanded steering angle and the second commanded steering angle.

16. The non-transitory computer-readable media of claim 15, wherein the model is a kinematic model and wherein controlling the vehicle:
  determining, based at least in part on a dynamic model of the vehicle, a first steering angle for the leading wheel and a second steering angle for the trailing wheel, the kinematic model and the dynamic model constraining the vehicle to have no sideslip;
  controlling, with a first steering controller, the leading wheel according to the first steering angle; and
  controlling, with a second steering controller, the trailing wheel according to the second steering angle.

17. The non-transitory computer-readable media of claim 16, wherein the determining the first steering angle and the second steering angle comprises:
  determining a first estimated steering angle for the leading wheel and a second estimated steering angle for the trailing wheel; and
  determining, based at least in part on a difference between a state of the vehicle and a desired state, a first corrective steering angle for the leading wheel and a second corrective steering angle for the trailing wheel,
  wherein the first steering angle is based at least in part on the first estimated steering angle and the first corrective steering angle and the second steering angle is based at least in part on the second estimated steering angle and the second corrective steering angle.

18. The vehicle of claim 1, wherein the negative ratio decreases with decreasing speeds below the first threshold speed and the positive ratio increases with increasing speeds above the second threshold speed.

19. The vehicle of claim 5, wherein the first model is a kinematic model and the second model is a dynamic model of the vehicle.

20. The non-transitory computer-readable media of claim 17, wherein:
  the determining the first estimated steering angle and the second estimated steering angle is based at least in part on a steady state single track model constrained by zero sideslip for the vehicle, and
  the determining the first corrective steering angle and the second corrective steering angle comprises minimizing a lateral offset of the vehicle relative to a reference path and an angular offset between a heading of the vehicle and the reference path.

* * * * *